US008391158B2

(12) United States Patent
Gupta et al.

(10) Patent No.: US 8,391,158 B2
(45) Date of Patent: Mar. 5, 2013

(54) CELL IDENTIFIER ASSIGNMENT AND SELECTION

(75) Inventors: Rajarshi Gupta, Santa Clara, CA (US); Peerapol Tinnakornsrisuphap, San Diego, CA (US); Parag A. Agashe, San Diego, CA (US); Amer Catovic, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 184 days.

(21) Appl. No.: 12/505,117

(22) Filed: Jul. 17, 2009

(65) Prior Publication Data

US 2010/0020710 A1 Jan. 28, 2010

Related U.S. Application Data

(60) Provisional application No. 61/083,848, filed on Jul. 25, 2008, provisional application No. 61/108,272, filed on Oct. 24, 2008.

(51) Int. Cl.
*H04J 3/14* (2006.01)
(52) U.S. Cl. .......................... 370/241; 370/310; 455/403
(58) Field of Classification Search ........................ None
See application file for complete search history.

(56) References Cited

U.S. PATENT DOCUMENTS

| 7,092,386 B2* | 8/2006 | Wynn ............................. 370/352 |
| 2005/0148368 A1 | 7/2005 | Scheinert et al. |
| 2006/0121907 A1* | 6/2006 | Mori et al. ...................... 455/447 |
| 2006/0221918 A1* | 10/2006 | Wang ............................. 370/338 |
| 2006/0268785 A1* | 11/2006 | Park et al. ...................... 370/331 |
| 2008/0310320 A1* | 12/2008 | Kim et al. ...................... 370/252 |
| 2009/0141685 A1* | 6/2009 | Berglund ....................... 370/331 |
| 2010/0008258 A1* | 1/2010 | Ji et al. .......................... 370/254 |
| 2011/0021205 A1* | 1/2011 | Horneman et al. ........... 455/450 |

FOREIGN PATENT DOCUMENTS

| RU | 2249917 C2 | 4/2005 |
| WO | 0011878 A2 | 3/2000 |

OTHER PUBLICATIONS

International Search Report and Written Opinion—PCT/US2009/051756, International Search Authority—European Patent Office—Dec. 18, 2009.
Nokia Siemens Networks, Nokia, "SON Use Case: Cell Phy_ID Automated Configuration", 3GPP TSG-RAN WG3 Meeting #59, R3-080376, Sorrento, Italy, Feb. 11-15, 2008.
3GPP TSG RAN WG2 62bis, "Reporting multiple and prior-observed CGI values in response to CGI Request", R2-083265, Apr. 7, 2008-L2, p. 1, par. 2.

* cited by examiner

*Primary Examiner* — Kevin C Harper
(74) *Attorney, Agent, or Firm* — Florin Corie; John J. Ketchum

(57) ABSTRACT

Systems and methodologies are described that facilitate providing physical cell identifier (PCI) assignment. Neighboring access point parameters can be collected and transmitted to a PCI assigning component, which can generate a PCI based on the parameters as well as other local parameters. The neighboring access point parameters can be received by evaluating signals transmitted by the neighboring access points, from a UE communicating with the neighboring access points, over a backhaul link, etc. The parameters can include signal strength, identification, and/or the like. In addition, prioritized lists of PCIs can be provided to an access point, which can utilize the neighborhood parameters to select an optimal PCI from the list.

89 Claims, 15 Drawing Sheets

CELL IDENTIFIER ASSIGNMENT AND SELECTION

CLAIM OF PRIORITY UNDER 35 U.S.C. §119

The present Application for Patent claims priority to Provisional Application No. 61/083,848 entitled "SYSTEMS AND METHODS FOR DISTRIBUTED, SERVER-BASED PCI SELECTION FOR BASE STATIONS" filed Jul. 25, 2008, and assigned to the assignee hereof and hereby expressly incorporated by reference herein and Provisional Application No. 61/108,272 entitled "PHYSICAL CELL IDENTITY ASSIGNMENT" filed Oct. 24, 2008, and assigned to the assignee hereof and hereby expressly incorporated by reference herein.

BACKGROUND

1. Field

The following description relates generally to wireless communications, and more particularly to assigning or selecting physical cell identifiers.

2. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, ...). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), and/or multi-carrier wireless specifications such as evolution data optimized (EV-DO), one or more revisions thereof, etc.

Generally, wireless multiple-access communication systems may simultaneously support communication for multiple mobile devices. Each mobile device may communicate with one or more access points (e.g., base stations) via transmissions on forward and reverse links. The forward link (or downlink) refers to the communication link from access points to mobile devices, and the reverse link (or uplink) refers to the communication link from mobile devices to access points. Further, communications between mobile devices and access points may be established via single-input single-output (SISO) systems, multiple-input single-output (MISO) systems, multiple-input multiple-output (MIMO) systems, and so forth. In addition, mobile devices can communicate with other mobile devices (and/or access points with other access points) in peer-to-peer wireless network configurations.

Access points utilize physical cell identifiers (PCI) to identify coverage cells or sectors provided by the access points. Such identifiers can be used, for example, by mobile devices to establish connection and/or continue communicating with the access points. In one implementation, PCIs can be assigned by a centralized entity that receives location information from access points and assigns PCIs based on location. In another implementation, PCI assignment can be distributed such that access points can select their own PCIs based on information obtained from other access points. In either case, PCI collision can occur where two access points share a PCI, and a device can receive from both access points, or PCI confusion can occur where one access point neighbors two access points having the same PCI.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with facilitating centralized physical cell identifier (PCI) assignment based at least in part on information gathered from neighboring cells to mitigate or minimize PCI collision and/or PCI confusion. In particular, an access point can measure radio frequency (RF) parameters of neighboring cells and provide such parameters to a PCI assignment entity. The access point can additionally provide local parameters, such as altitude, transmit power, etc. of the access point, and the PCI assignment entity can generate one or more PCIs for the access point based on the local and neighborhood parameters. The PCI assignment entity can, additionally or alternatively, provide a prioritized list of PCIs to the access point, and the access point can select a PCI from the list. In one example, the list can be prioritized based at least in part on the local and neighborhood parameters described above.

According to related aspects, a method is provided that includes measuring one or more RF parameters related to one or more neighboring access points. The method further includes transmitting the one or more RF parameters to a network component to receive a PCI assignment.

Another aspect relates to a wireless communications apparatus. The wireless communications apparatus can include at least one processor configured to receive one or more RF parameters related to one or more surrounding access points. The at least one processor is further to configured transmit a request for a PCI to a network component including the one or more RF parameters. The wireless communications apparatus also comprises a memory coupled to the at least one processor.

Yet another aspect relates to an apparatus. The apparatus includes means for obtaining one or more RF parameters from one or more neighboring access points and means for transmitting the one or more RF parameters with a request for a PCI.

Still another aspect relates to a computer program product, which can have a computer-readable medium including code for causing at least one computer to measure one or more RF parameters related to one or more neighboring access points. The computer-readable medium can also comprise code for causing the at least one computer to transmit the one or more RF parameters to a network component to receive a PCI assignment.

Moreover, an additional aspect relates to an apparatus including a neighborhood measuring component that receives one or more RF parameters from one or more neighboring access points. The apparatus can further include a PCI requesting component that transmits the one or more RF parameters with a request for a PCI.

According to other aspects, a method is provided that includes receiving a PCI request from an access point comprising one or more RF parameters related to one or more neighboring access points. The method also includes selecting a PCI for the access point based at least in part on the one or more RF parameters and transmitting the PCI to the access point.

Another aspect relates to a wireless communications apparatus. The wireless communications apparatus can include at least one processor configured to receive a PCI request from an access point comprising one or more RF parameters related to surrounding access points. The at least one processor is further configured to determine a PCI for the access point based at least in part on comparing the one or more RF parameters and available PCIs and transmit the PCI to the access point. The wireless communications apparatus also comprises a memory coupled to the at least one processor.

Yet another aspect relates to an apparatus. The apparatus includes means for receiving one or more RF parameters from an access point related to at least one neighboring access point. The apparatus also includes means for selecting a PCI for the access point based at least in part on the one or more RF parameters and means for transmitting the PCI to the access point.

Still another aspect relates to a computer program product, which can have a computer-readable medium including code for causing at least one computer to receive a PCI request from an access point comprising one or more RF parameters related to one or more neighboring access points. The computer-readable medium can also comprise code for causing the at least one computer to select a PCI for the access point based at least in part on the one or more RF parameters and code for causing the at least one computer to transmit the PCI to the access point.

Moreover, an additional aspect relates to an apparatus including a PCI parameter receiving component that obtains one or more RF parameters from an access point related to at least one neighboring access point. The apparatus can further include a PCI selecting component that chooses a physical cell identifier (PCI) for the access point based at least in part on the one or more RF parameters and a PCI transmitting component that provides the PCI to the access point.

In addition, a method that includes receiving a list of PCIs from a network component is provided. The method also includes selecting a PCI from the list of PCIs based at least in part on a parameter related to the PCI indicated in the list of PCIs.

Another aspect relates to a wireless communications apparatus. The wireless communications apparatus can include at least one processor configured to receive a list of PCIs from a network component. The at least one processor is further configured to select a PCI from the list of PCIs based on an associated parameter in the list to facilitate communicating in a wireless network. The wireless communications apparatus also comprises a memory coupled to the at least one processor.

Yet another aspect relates to an apparatus. The apparatus includes means for receiving a list of PCIs from a network component. The apparatus also includes means for selecting a PCI in the list of PCIs for communicating in a wireless network according to a parameter of the PCI specified in the list of PCIs.

Still another aspect relates to a computer program product, which can have a computer-readable medium including code for causing at least one computer to receive a list of PCIs from a network component. The computer-readable medium can also comprise code for causing the at least one computer to select a PCI from the list of PCIs based at least in part on a parameter of the PCI indicated in the list of PCIs.

Moreover, an additional aspect relates to an apparatus including a PCI receiving component that obtains a list of PCIs from a network component. The apparatus can further include a PCI selecting component that chooses a PCI in the list of PCIs for communicating in a wireless network according to a parameter of the PCI specified in the list of PCIs.

In accordance with additional aspects, a method is provided that includes receiving a PCI request from an access point comprising one or more parameters related to the access point. The method also includes evaluating one or more disparate parameters received from a plurality of disparate access points and generating a list of PCIs for the access point indicating at least one list parameter for each PCI based at least in part on the one or more parameters as compared to the one or more disparate parameters.

Another aspect relates to a wireless communications apparatus. The wireless communications apparatus can include at least one processor configured to obtain a PCI request from an access point comprising one or more parameters related to the access point. The at least one processor is further configured to analyze one or more disparate parameters received from a plurality of disparate access points and create a list of PCIs for the access point with a list parameter for each of the PCIs based at least in part on the one or more parameters as compared to the one or more disparate parameters. The wireless communications apparatus also comprises a memory coupled to the at least one processor.

Yet another aspect relates to an apparatus. The apparatus includes means for receiving a PCI request from an access point comprising one or more parameters related to the access point. The apparatus also includes means for generating a list of PCIs for the access point with a list parameter for each PCI based at least in part on the one or more parameters as compared to one or more disparate parameters received from one or more disparate access points.

Still another aspect relates to a computer program product, which can have a computer-readable medium including code for causing at least one computer to receive a PCI request from an access point comprising one or more parameters related to the access point and code for causing the at least one computer to evaluate one or more disparate parameters received from a plurality of disparate access points. The computer-readable medium can also comprise code for causing the at least one computer to generate a list of PCIs for the access point with list parameters based at least in part on the one or more parameters as compared to the one or more disparate parameters.

Moreover, an additional aspect relates to an apparatus including a PCI parameter receiving component that obtains a PCI request from an access point comprising one or more parameters related to the access point. The apparatus can further include a PCI listing component that creates a list of PCIs for the access point with a list parameter for each PCI based at least in part on the one or more parameters as compared to one or more disparate parameters received from one or more disparate access points.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed and this description is intended to include all such aspects and their equivalents.

DETAILED DESCRIPTION

Figure 1:
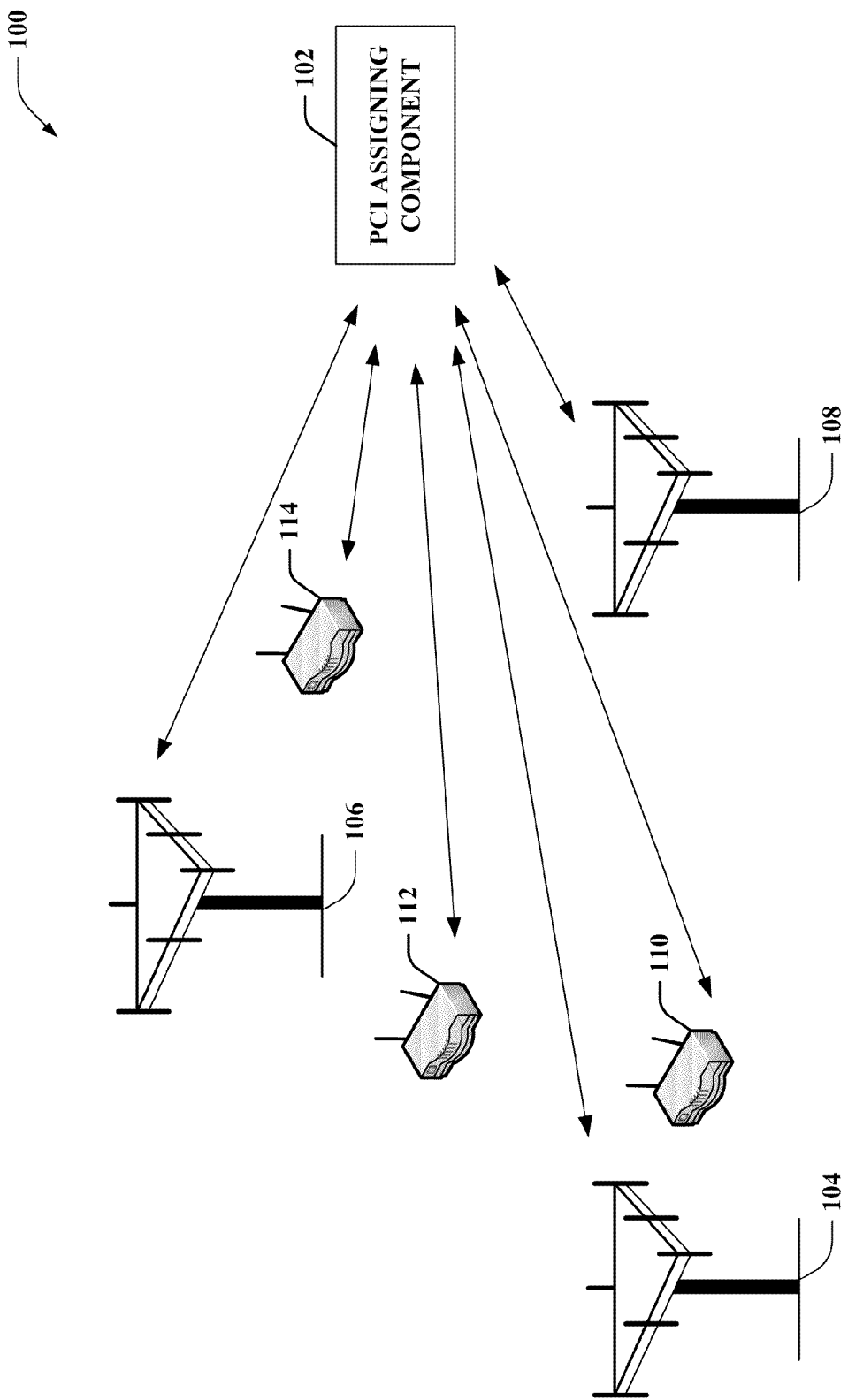
FIG. 1 is an illustration of an example wireless communication system that facilitates centralized assignment of physical cell identifiers (PCI).

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring to FIG. 1, a wireless communication system 100 is illustrated that facilitates centralized PCI assignment based on information of neighboring access points. System 100 includes a physical cell identifier (PCI) assigning component 102 that allocates one or more PCIs to one or more access points. PCI assigning component 102 can be part of a core wireless network, present within a disparate access point, or otherwise located so it is accessible by a plurality of access points. PCI assigning component 102, for example, can be an operations, administration, and management (OAM) system, network management system (NMS), and/or the like. System 100 can also include a plurality of macrocell access points 104, 106, 108 and/or a plurality of lower power access points 110, 112, 114, which can be, for example, femtocell access points, picocell access points, relay nodes, and/or the like.

According to an example, access point 110 can attempt to participate in a wireless network, for example upon initialization, power cycle, connection reestablishment, and/or the like. As part of joining the wireless network, the access point 110 can acquire a PCI to allow other devices to communicate with the access point 110 and/or one or more sectors implemented by the access point 110. In one example, the access point 110 can measure radio frequency (RF) parameters of surrounding access points, such as macrocell access point 104, access point 112, and/or substantially any access point in-range. The RF parameters, for example, can relate to signal quality, path loss, identity (e.g., PCI of the neighboring access points), traffic, a number of devices communicating with the access point, etc. The access point can provide the neighborhood RF parameters to the PCI assigning component 102 along with optionally other local parameters about the access point 110, such as location, altitude, transmit power, etc.

The PCI assigning component 102 can receive the parameters and generate one or more PCIs for the access point 110 based at least in part on the parameters. For example, the PCI assigning component 102 can compare the parameters with other parameters received from neighboring access points, which can be identified in the received parameters, as mentioned. For example, if access point 110 does not provide information, or provides signal quality or other parameter below a threshold related to access point 114, the PCI assigning component 102 can assign the PCI used by access point 114 to the access point 110. This could be especially true, for example, for large reported altitude difference from the access point 110 and access point 114. In an alternative example, if signal quality or interference of access point 104 is measured above a threshold at access point 110, PCI assigning component 102 can search for other PCIs than that of access point 104 (e.g., PCI of access point 114 which likely does not interfere with access point 110) to allocate to the access point 110.

In another example, PCI assigning component 102 can prioritize a list of possible PCIs for the access point 110, which can be based on parameters received by the PCI assigning component 102. For example, the PCI assigning component 102 can transmit the list to access point 110 allowing access point 110 to select a PCI from the list based on measured neighborhood parameters or local parameters, such as neighboring RF information, altitude, transmission power, etc.

Figure 2:
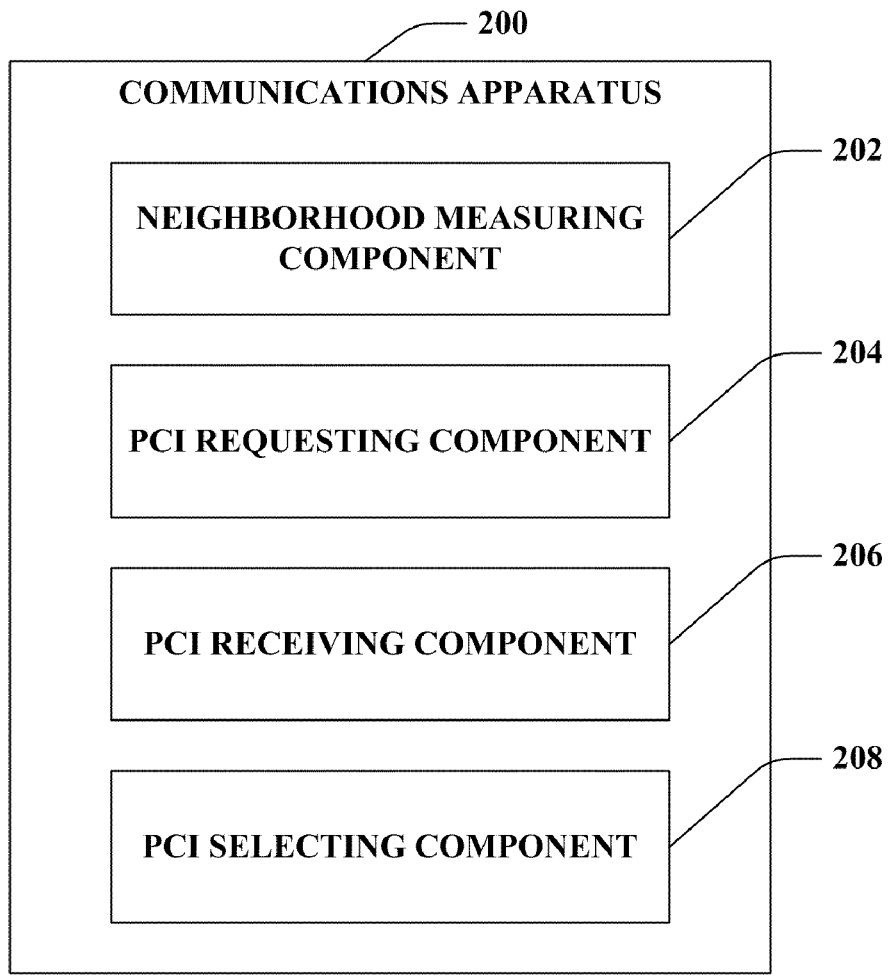
FIG. 2 is an illustration of an example communications apparatus for employment within a wireless communications environment.

Turning to FIG. 2, illustrated is a communications apparatus 200 for employment within a wireless communications environment. The communications apparatus 200 can be an access point, mobile device, or a portion thereof, or substantially any communications apparatus that participates in a wireless network. The communications apparatus 200 includes a neighborhood measuring component 202 that can receive and measure parameters of surrounding communications apparatuses (not shown), a PCI requesting component 204 that can communicate with a core network component (not shown) or other component to request a PCI for communicating in a wireless network, and a PCI receiving component 206 that can obtain a PCI from the core network or other component.

According to an example, the communications apparatus 200 can attempt to join a wireless network. As part of joining the network, the PCI requesting component 204 can request a PCI from the network to allow subsequent identification in communicating with the network and/or one or more devices. In one example, the PCI requesting component 204 can include parameters in the request related to the communications apparatus 200 (e.g., location, altitude, transmit power, or other parameters known by the communications apparatus 200) and/or one or more neighboring devices. For instance, the neighborhood measuring component 202 can acquire parameters from the neighboring devices, such as identity (e.g. PCI), signal quality/strength, path loss, traffic, etc. The neighborhood measuring component 202 can receive RF signals from the neighboring devices and measure and/or decode the signals to determine the parameters. In another example, the neighborhood measuring component 202 determine parameters based on measurement reports from devices communicating with the communications apparatus 200 (e.g., one or more UEs or other devices receiving network access). In yet another example, the neighborhood measuring component 202 can receive such parameters over a backhaul link from the neighboring devices.

PCI receiving component 206 can receive one or more PCIs in response to the request. For example, the PCI can be provided based on the parameters specified in the request to minimize collision among PCIs, as described above. In an example, the PCI receiving component 206 can receive a list of PCIs, which can be prioritized. Based at least in part on local parameters and/or those retrieved via neighborhood measuring component 202, the PCI selecting component 208 can choose an optimal PCI from the list. In this example, PCI requesting component 204 need not send local and/or neighborhood measurement parameters with the request, and selection logic (or a portion thereof) is performed by the PCI selecting component 208 rather than by the component from which PCI was requested. In one example, the list of PCIs can be prioritized or ranked; similarly, in an example, the list can include a probability with which one or other of the PCIs may be selected by disparate devices.

Figure 3:
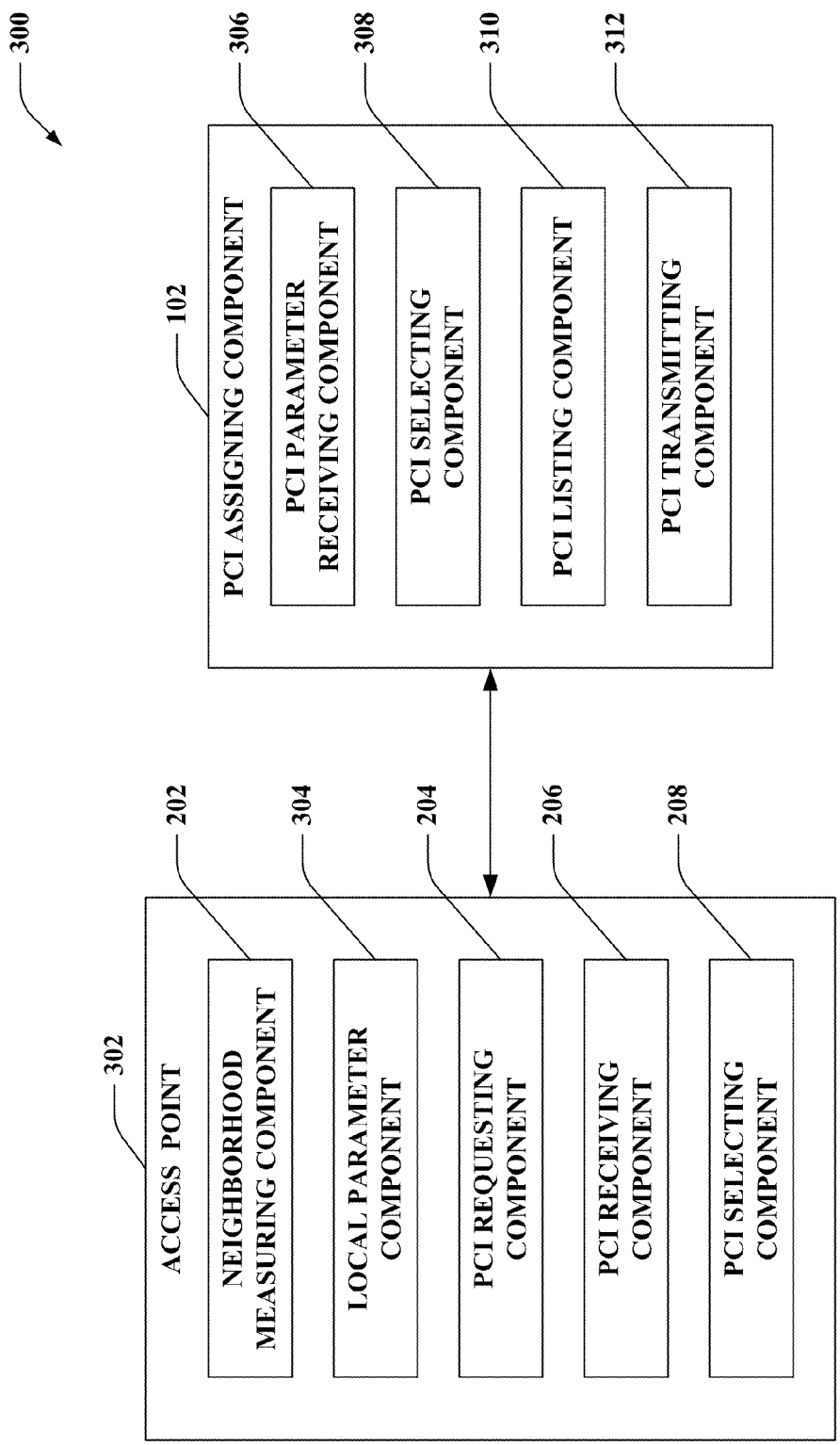
FIG. 3 is an illustration of an example wireless communications system for assigning PCIs.

Now referring to FIG. 3, illustrated is a wireless communications system 300 that facilitates requesting a PCI along with parameters related to one or more neighboring access points. Access point 302 can be a macrocell base station, femtocell access point, picocell access point, relay node, a portion thereof, and/or substantially any wireless device that can be assigned a PCI. PCI assigning component 102, as described, can be an upstream network component (e.g., in the core network), such as an OAM, NMS, present in a disparate access point, and/or a portion thereof. Moreover, system 300 can be a MIMO system and/or can conform to one or more wireless network system specifications (e.g., EV-DO, 3GPP, 3GPP2, 3GPP LTE, WiMAX, etc.) and can comprise additional components to facilitate communicating between the access point 302 and PCI assigning component 102.

Access point 302 can comprise a neighborhood measuring component 202 that can evaluate one or more neighboring access points to determine parameters related thereto, a local parameter component 304 that can receive one or more parameters related to the access point 302, a PCI requesting component 204 that can transmit a request for PCI along with the determined parameters and/or one or more local parameters, a PCI receiving component 206 that can receive one or more PCIs based on the request, and a PCI selecting component 208 that can choose a PCI where a plurality of PCIs are sent in response to the request. PCI assigning component 102 comprises a PCI parameter receiving component 306 that can receive a PCI request and associated parameters, a PCI selecting component 308 that can choose a PCI for the request based at least in part on the parameters, a PCI listing component 310 that can generate a plurality of PCIs for the request, and a PCI transmitting component 312 that can transmit one or more PCIs based at least in part on the request.

According to an example, access point 302 can attempt to obtain a PCI in a wireless network. This can be initiated, for example, as part of joining the wireless network following power cycle, during initial setup, and/or the like. The neighborhood measuring component 202, as described, can receive RF signals from neighboring access points and measure parameters related to the signals, such as signal strength, path loss, an identity (e.g. PCI) of the access points or related sectors, network traffic, and/or the like. The neighborhood measuring component 202, for example, can obtain neighborhood RF parameters by using a radio receiver to receive the parameters, using received UE measurement reports to learn PCIs, communicating with neighboring access points over a backhaul, and/or the like. In addition, the local parameter component 304 can obtain one or more parameters about the access point 302, such as location, altitude, transmit power, and/or the like. The PCI requesting component 204 can generate and transmit a request for a PCI and include the neighborhood and/or local parameters in the request.

PCI parameter receiving component 306 can obtain the request and related parameters. Based on the parameters, the PCI selecting component 308 can choose a PCI for the access point 302. For example, the PCI selecting component 308 can analyze the neighborhood parameters determining PCIs of other access points that possibly interfere with the access point 302—the PCI selecting component 308 can avoid such PCIs. In addition, the PCI selecting component 308 can analyze the parameters along with other received parameters of other access points (e.g. where the access points identified in the neighborhood have additionally received a PCI from PCI assigning component 102 and provided their own local and neighborhood parameters). In one example, the PCI selecting component 308 can evaluate an altitude of the access point, as reported. Where the altitude is high, for example, a PCI assigned to the access point 302 will likely travel far (e.g., in a related signal from or to the access point 302) since there are likely less obstacles. Thus, altitude can affect the neighborhood parameters, and thus, selection of PCI. Similarly, the transmit power of the access point 302 can be evaluated such that for high transmit power, the PCI selecting component 308 can ensure a PCI is not assigned to another access point in a further range than for low transmit power.

In yet another example, where the neighborhood parameters include access points having signal quality beyond a threshold, the PCI selecting component 308 can avoid assigning the same or similar PCI to the access point 302. The PCI selecting component 308 can have parameters from the access point 302, such as a rough location, RF neighborhood parameters, PCI of neighbors, altitude, transmit power, etc., and can select the PCI to minimize interference based on this additional information. As described, it can also use similar information from other access points. Upon selecting a PCI, the PCI transmitting component 312 can provide the PCI to the access point 302. The PCI receiving component 206 can obtain the PCI and begin using the PCI in subsequent transmissions.

In another example, the PCI listing component 310 can generate a list of PCIs for the access point 302 based on one or more parameters. In this example, the access point 302 can send a portion of the neighborhood and/or local parameters (or no parameters at all), and the PCI assigning component 102 can provide some possible PCIs. The PCI transmitting component 312 can provide the list of PCIs to the access point 302. The PCI receiving component 206 can receive the list of PCIs and the PCI selecting component 208 can choose a PCI to utilize from the list. In one example, the logic of the PCI selecting component 208 can be similar to that of the PCI selecting component 308 described above. Thus, in one example, the PCI requesting component 204 can transmit local parameters (or no parameters) to the PCI assigning component 102, which can be received at the PCI parameter receiving component 306. The PCI listing component 310 can determine or otherwise select a list of PCIs for the access point 302 based on the local parameters, which can relate to location, altitude, transmit power, etc. of the access point 302.

In an example, the PCI listing component 310 can prioritize the list of PCIs by determining best matches of available PCIs for the access point 302 based on received and/or known parameters of the access point 302 (and/or other access points). For example, as described, the PCI parameter receiving component 306 can receive local parameters of neighboring access points, including location, transmit power, altitude, etc., and based on this information, the PCI listing component 310 can select a plurality of PCIs for the access point 302 by comparing the location, transmit power, altitude, etc., of the access point 302 with that of the other access points. For example, the PCI listing component 310 can select one or more PCIs for the access point 302 related to disparate access points that are far away and/or transmit at a low transmission power given their location such that access point 302 will likely not experience interference related to the disparate access point. The PCI listing component 310 can prioritize the list, in one example, according to transmit power, location, operator configuration, number of associated users, type of cell (e.g., macrocell, picocell, femtocell, etc.), and/or the like.

In addition, the PCI listing component 310 can use the list for other access points, but utilize a different permutation of the list according to parameters received by the PCI parameter receiving component 306, and/or according to previous lists provided by the PCI listing component 310, for example. In yet another example, the PCI listing component 310 can randomize the list according to probability of selecting a PCI for a given access point. This can be computed, for example, based on known or received parameters of the given access point, history of PCI selection at the given access point, etc. In this regard, for example, the PCI listing component 310 can include parameters of the PCIs in the list, such as a priority, probability that the PCI will be selected, and/or the like. In any case, as described, the PCI transmitting component 312 can transmit the list for utilization by one or more access points. Upon receiving the list, as described, the PCI selecting component 208 can choose a PCI to utilize based on one or more neighborhood parameters obtained by the neighborhood measuring component 202. Thus, in this example, at least a portion of PCI selection can be performed at the access point 302.

Referring to FIGS. 4-7, methodologies relating to providing server-based PCI assignment are illustrated. While, for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 4:
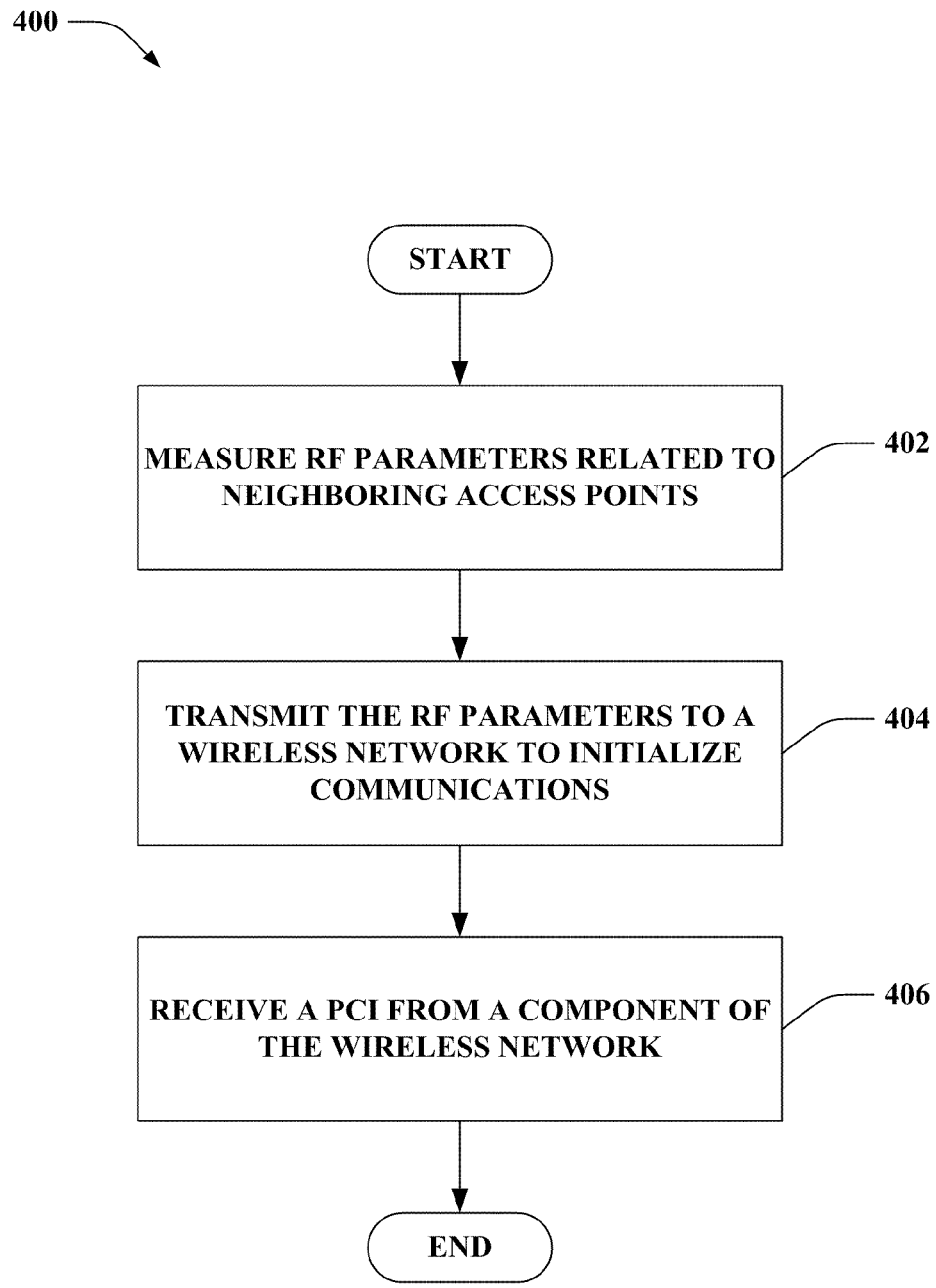
FIG. 4 is an illustration of an example methodology that requests PCI assignment specifying neighborhood RF parameters in the request.

Turning to FIG. 4, an example methodology 400 that facilitates obtaining a PCI in a wireless network is illustrated. At 402, RF parameters related to neighboring access points can be measured. As described, this can include receiving signals from the neighboring access points and measuring signal strength, path loss, traffic, etc., as well as receiving an identifier and/or PCI of the neighboring access points. In addition, the parameters can be received from a UE communicating with the neighboring access points, over a backhaul connection with the neighboring access points, and/or the like, as described. At 404, the RF parameters can be transmitted to a wireless network to initialize communications. For example, the RF parameters can be transmitted in a PCI request. As described, the RF parameters can be utilized, along with local parameters that can also be transmitted, to select a PCI. At 406, the PCI can be received from a component of the wireless network, such as an OAM, NMS, or other component that comprises functionality for assigning PCIs, as described above.

Figure 5:
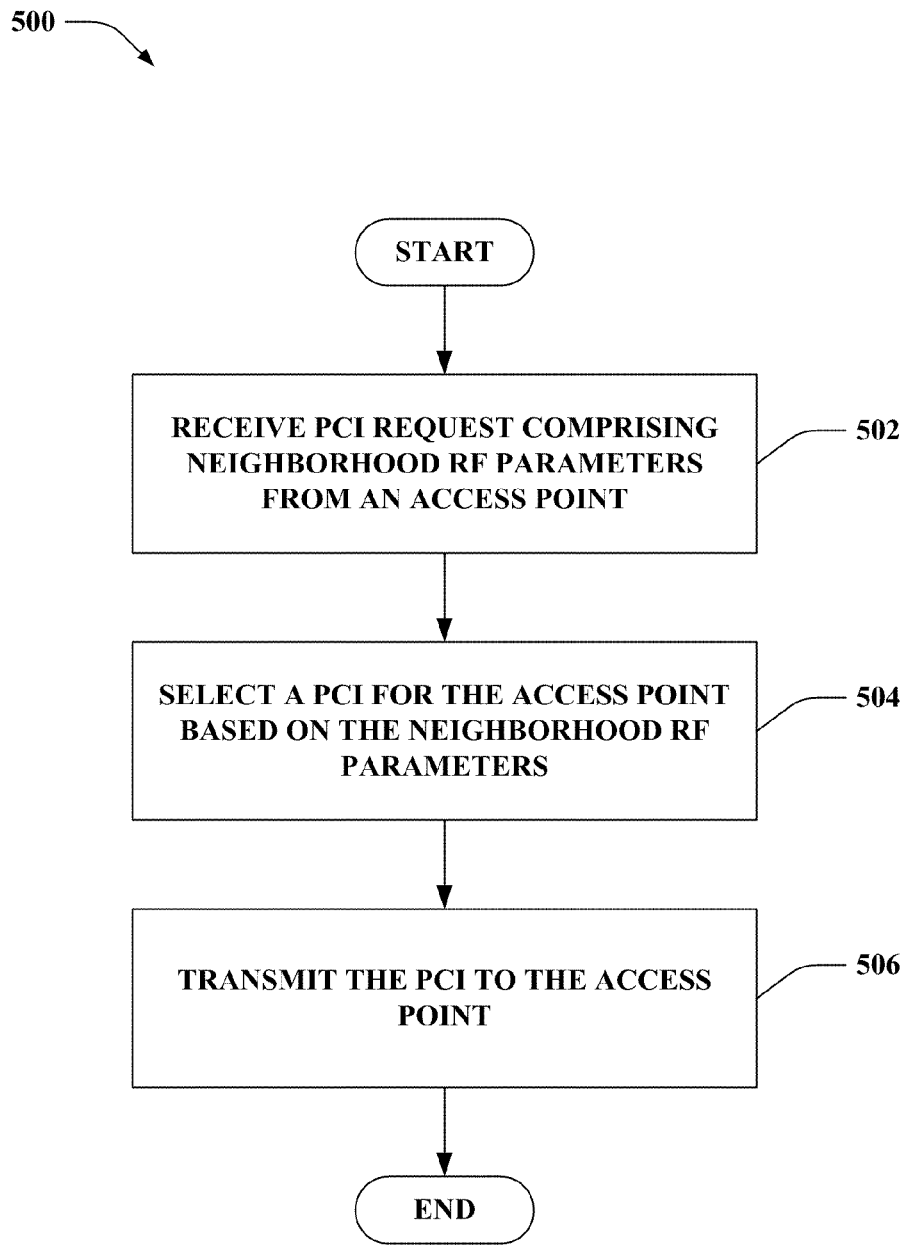
FIG. 5 is an illustration of an example methodology that receives a request for PCI assignment comprising neighborhood RF parameters.

Referring to FIG. 5, an example methodology 500 is shown that selects a PCI for an access point based on received neighborhood RF parameters. At 502, a PCI request comprising neighborhood RF parameters can be received from an access point. As described, the parameters can relate to strength of a signal received from neighboring access points at the access point, an identification or PCI of the neighboring access points, etc. Based on these neighborhood RF parameters, at 504, a PCI can be selected for the access point. For example, if there are unused available PCIs (e.g. as indicated by absence of one or more PCIs in the neighborhood list) one or more unused PCIs can be selected for the access point. In another example, a PCI of a neighboring access point having a signal strength below a threshold level, as indicated by the RF parameters, can be selected for the access point. In addition, as described, local parameters of the access point can be considered, such as location, transmit power, altitude, etc. Also, local parameters received from the neighboring access points in previous PCI requests can be utilized as well to select a PCI for the access point, as described. At 506, the selected PCI can be transmitted to the access point for utilization in wireless network communications.

Figure 6:
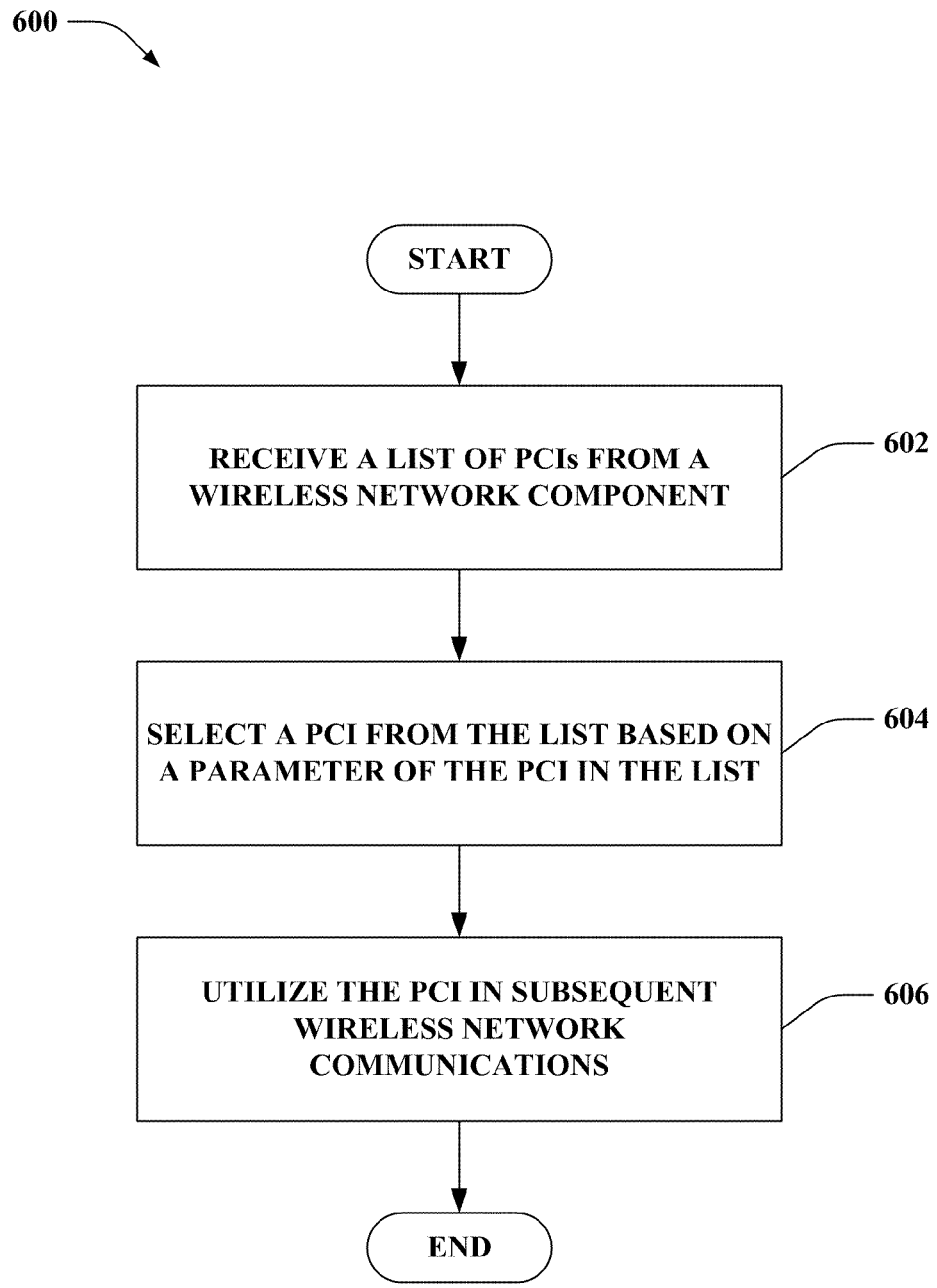
FIG. 6 is an illustration of an example methodology that receives a list of PCIs based on a PCI request.

Turning to FIG. 6, an example methodology 600 that facilitates receiving a PCI list and selecting a PCI therefrom is illustrated. At 602, a list of PCIs can be received from a wireless network component, such as an OAM, NMS, etc. The list can be prioritized such that highest ranking PCIs are separated from lower ranking PCIs. It is to be appreciated that the PCI list can be received in response to a PCI request, which specified one or more local parameters, in one example. At 604, a PCI can be selected from the list based on a parameter of the PCI in the list. The parameter can be a priority, a probability that the PCI will be selected by one or more disparate access points, and/or the like. In addition, however, the PCI can be selected based on measured RF parameters relating to neighboring access points, as described. In this regard, a highest ranked PCI may not be the most desirable according to the RF parameters, and a next highest ranked PCI can be chosen, for example. At 606, the PCI can be utilized in subsequent wireless network communications for identification.

Figure 7:
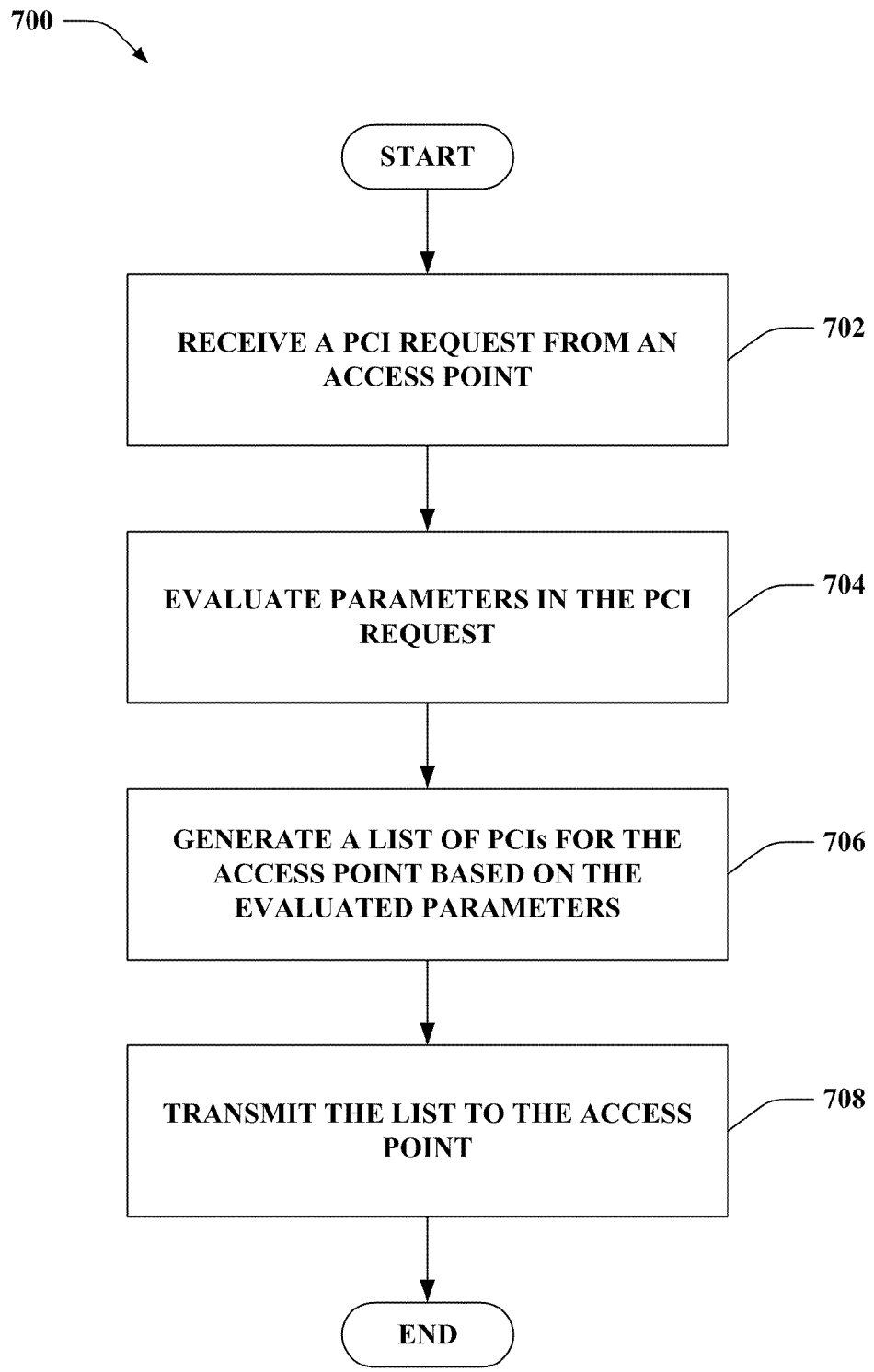
FIG. 7 is an illustration of an example methodology that formulates a PCI list based on a receive PCI request.

Referring to FIG. 7, an example methodology 700 is shown that generates a list of PCIs for an access point. At 702, a PCI request can be received from an access point. For example, the PCI request can comprise one or more parameters related to the access point, such as location, transmit power, altitude, etc. At 704, the parameters in the PCI request can be evaluated, and a list of PCIs can be generated for the access point based on the evaluated parameters, at 706. For instance, the list can be generated based on comparing the parameters to disparate parameters received by disparate access points in previous PCI requests, or other known information about the access point and disparate access points. In addition, as described, the list can be generated based on previous lists; a permutation of the list can be generated from previous lists to minimize PCI collision. Thus, for example, where similarly located access points request a PCI, a list can be sent to one access point, and a permutated version of the list can be sent to the other access point. The access points can select the PCIs based on list priority, and will likely select different PCIs, as described. At 708, the list can be transmitted to the access point.

It will be appreciated that, in accordance with one or more aspects described herein, inferences can be made regarding determining a PCI for an access point based on a collection of parameters, determining PCI list priority order, and/or the like. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 8:
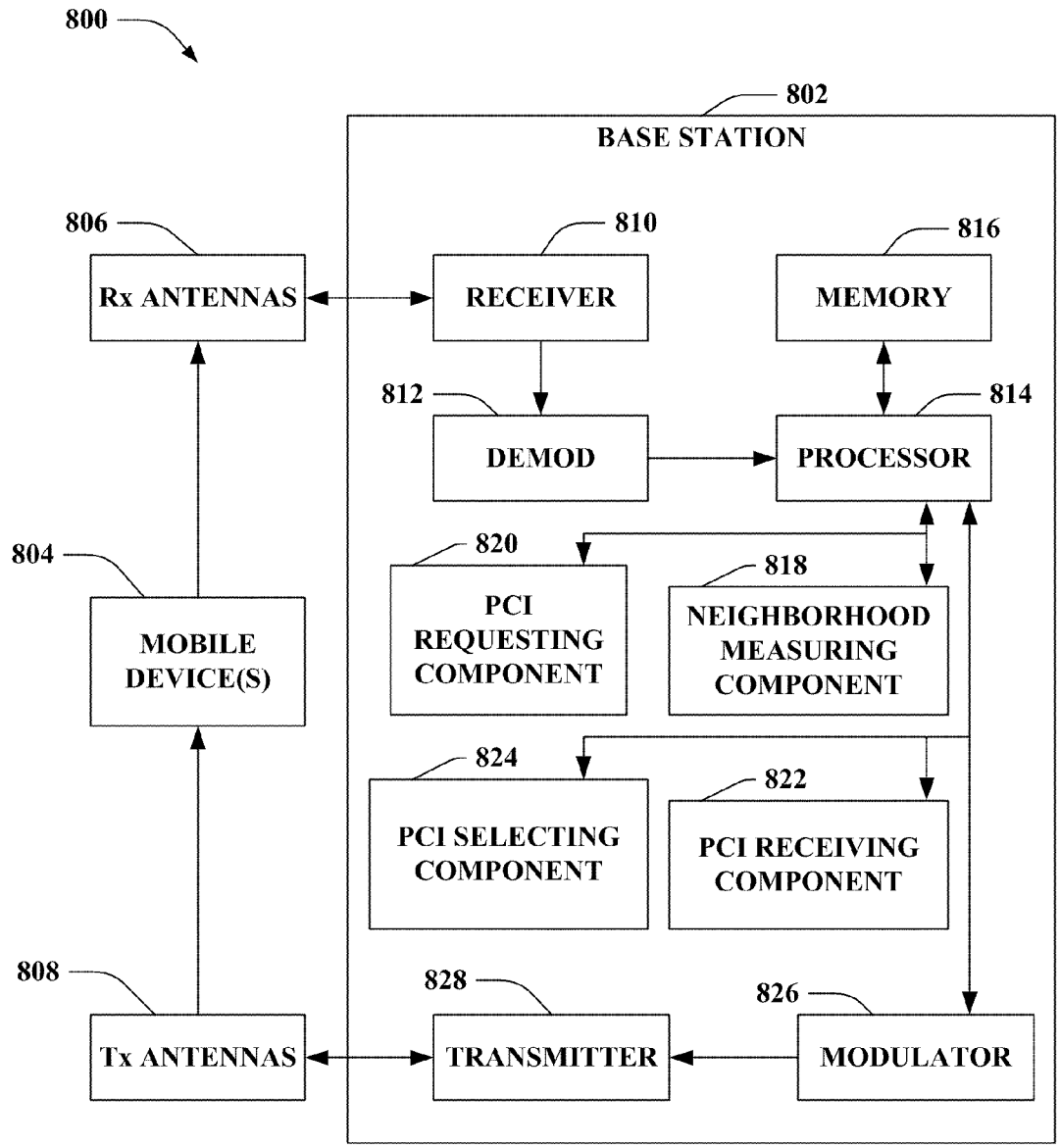
FIG. 8 is an illustration of an example system that receives one or more PCIs based on a PCI request.

FIG. 8 is an illustration of a system 800 that facilitates requesting a PCI in a wireless network. The system 800 comprises a base station 802 (e.g., access point, . . . ) with a receiver 810 that receives signal(s) from one or more mobile devices 804 through a plurality of receive antennas 806, and a transmitter 828 that transmits to the one or more mobile devices 804 through a transmit antenna 808. Receiver 810 can receive information from receive antennas 806 and is operatively associated with a descrambler that can decode received signals. Furthermore, demodulator 812 can demodulate received descrambled signals. Demodulated symbols are analyzed by a processor 814. The processor 814 can be a processor dedicated to analyzing information received by receiver 810 and/or generating information for transmission by a transmitter 828, a processor that controls one or more components of base station 802, and/or a processor that both analyzes information received by receiver 810, generates information for transmission by transmitter 828, and controls one or more components of base station 802. In addition, processor 814 can be coupled to a memory 816 that stores information related to estimating a signal (e.g., pilot) strength and/or interference strength, data to be transmitted to or received from mobile device(s) 804 (or a disparate base station (not shown)), and/or any other suitable information related to performing the various actions and functions set forth herein.

It will be appreciated that memory 816 (or other data stores), described herein, can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 816 of the subject systems and methods is intended to comprise, without being limited to, these and any other suitable types of memory.

Processor 814 is further coupled to a neighborhood measuring component 818 that can obtain parameters related to neighboring access points, a PCI requesting component 820 that can transmit a request for a PCI to a network component (not shown), a PCI receiving component 822 that can obtain a PCI in response to a PCI request or otherwise, and a PCI selecting component 824 that can select a PCI where a list of PCIs is received. As described, the neighborhood measuring component 818 can obtain parameters related to neighboring access points, such as signal strength at base station 802, identifier, PCI, etc., by receiving signals from the access point over the air or over a backhaul, from mobile devices 804 communicating or that have communicated with the neighboring access points, and/or the like. In one example, PCI requesting component 820 can utilize the parameters in requesting a PCI from a network component. In addition or alternatively, the PCI requesting component 820 can request the PCI using local parameters of the base station 802.

In either case, the PCI requesting component 820 can request a PCI. The PCI receiving component 822 can receive a PCI or a list of PCIs. Where a list of PCIs is received, the PCI selecting component 824 can choose from the list. This can be according to parameters obtained by the neighborhood measuring component 818, as described. Upon selecting a PCI, or if one PCI is received at the PCI receiving component 822, the base station 802 can utilize the PCI in subsequent communications. Furthermore, although depicted as being separate from the processor 814, it is to be appreciated that the demodulator 812, neighborhood measuring component 818, PCI requesting component 820, PCI receiving component 822, PCI selecting component 824, and/or modulator 826 can be part of the processor 814 or multiple processors (not shown).

Figure 9:
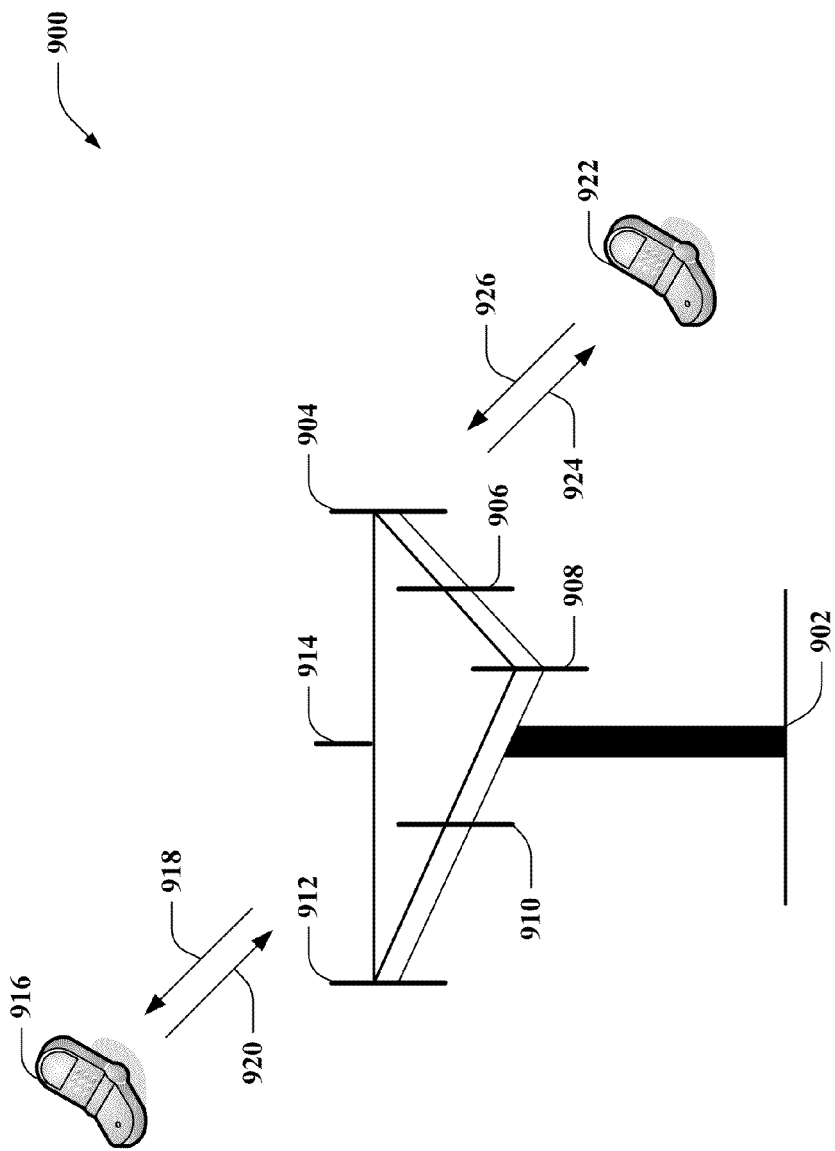
FIG. 9 is an illustration of a wireless communication system in accordance with various aspects set forth herein.

Referring now to FIG. 9, a wireless communication system 900 is illustrated in accordance with various embodiments presented herein. System 900 comprises a base station 902 that can include multiple antenna groups. For example, one antenna group can include antennas 904 and 906, another group can comprise antennas 908 and 910, and an additional group can include antennas 912 and 914. Two antennas are illustrated for each antenna group; however, more or fewer antennas can be utilized for each group. Base station 902 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 902 can communicate with one or more mobile devices such as mobile device 916 and mobile device 922; however, it is to be appreciated that base station 902 can communicate with substantially any number of mobile devices similar to mobile devices 916 and 922. Mobile devices 916 and 922 can be, for example, cellular phones, smart phones, laptops, handheld communication devices, handheld computing devices, satellite radios, global positioning systems, PDAs, and/or any other suitable device for communicating over wireless communication system 900. As depicted, mobile device 916 is in communication with antennas 912 and 914, where antennas 912 and 914 transmit information to mobile device 916 over a forward link 918 and receive information from mobile device 916 over a reverse link 920. Moreover, mobile device 922 is in communication with antennas 904 and 906, where antennas 904 and 906 transmit information to mobile device 922 over a forward link 924 and receive information from mobile device 922 over a reverse link 926. In a frequency division duplex (FDD) system, forward link 918 can utilize a different frequency band than that used by reverse link 920, and forward link 924 can employ a different frequency band than that employed by reverse link 926, for example. Further, in a time division duplex (TDD) system, forward link 918 and reverse link 920 can utilize a common frequency band and forward link 924 and reverse link 926 can utilize a common frequency band.

Each group of antennas and/or the area in which they are designated to communicate can be referred to as a sector of base station 902. For example, antenna groups can be designed to communicate to mobile devices in a sector of the areas covered by base station 902. In communication over forward links 918 and 924, the transmitting antennas of base station 902 can utilize beamforming to improve signal-to-noise ratio of forward links 918 and 924 for mobile devices 916 and 922. Also, while base station 902 utilizes beamforming to transmit to mobile devices 916 and 922 scattered randomly through an associated coverage, mobile devices in neighboring cells can be subject to less interference as compared to a base station transmitting through a single antenna to all its mobile devices. Moreover, mobile devices 916 and 922 can communicate directly with one another using a peer-to-peer or ad hoc technology (not shown).

According to an example, system 900 can be a multiple-input multiple-output (MIMO) communication system. Further, system 900 can utilize substantially any type of duplexing technique to divide communication channels (e.g., forward link, reverse link, . . . ) such as FDD, FDM, TDD, TDM, CDM, and the like. In addition, communication channels can be orthogonalized to allow simultaneous communication with multiple devices over the channels; in one example, OFDM can be utilized in this regard. Thus, the channels can be divided into portions of frequency over a period of time. In addition, frames can be defined as the portions of frequency over a collection of time periods; thus, for example, a frame can comprise a number of OFDM symbols. The base station 902 can communicate to the mobile devices 916 and 922 over the channels, which can be created for various types of data. For example, channels can be created for communicating various types of general communication data, control data (e.g. quality information for other channels, acknowledgement indicators for data received over channels, interference information, reference signals, etc.), and/or the like. In an example, base station 902 can request a PCI from a network component (not shown), as described. The base station 902 can leverage mobile devices 916 and/or 922 to measure parameters of other surrounding base stations (not shown), as described in one example.

Figure 10:
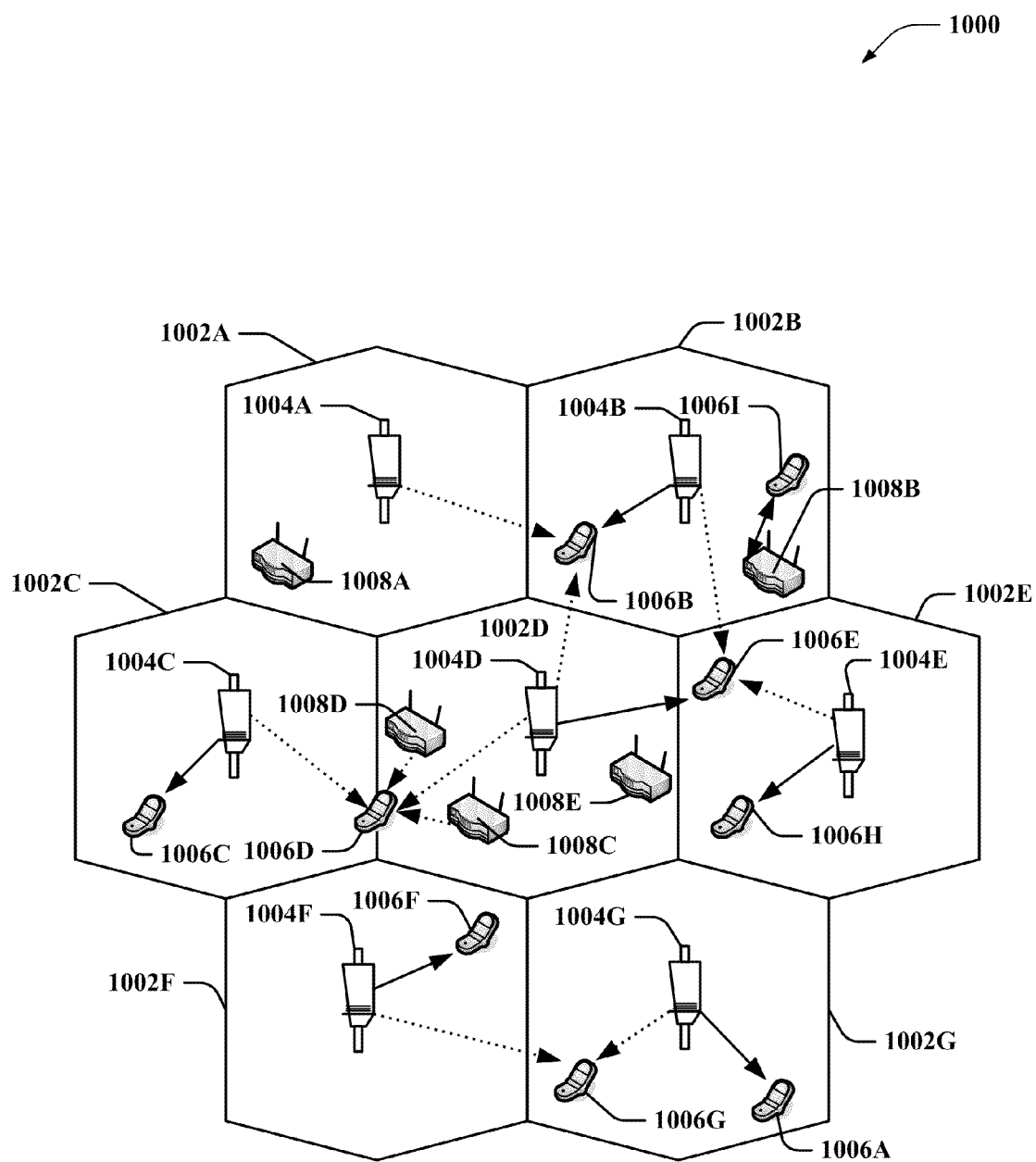
FIG. 10 is an illustration of a wireless communication network in accordance with aspects described herein.

Now referring to FIG. 10, a wireless communication system 1000 configured to support a number of mobile devices is illustrated. The system 1000 provides communication for multiple cells, such as for example, macrocells 1002A-1002G, with each cell being serviced by a corresponding access point 1004A-1004G. As described previously, for instance, the access points 1004A-1004G related to the macrocells 1002A-1002G can be base stations. Mobile devices 1006A-1006I are shown dispersed at various locations throughout the wireless communication system 1000. Each mobile device 1006A-1006I can communicate with one or more access points 1004A-1004G on a forward link and/or a reverse link, as described. In addition, access points 1008A-1008E are shown. These can be lower powered small scale access points, such as femtocell access points, picocell access points, relay nodes, mobile base stations, and/or the like, offering services related to a particular service location, as described. The mobile devices 1006A-1006I can additionally or alternatively communicate with these small scale access points 1008A-1008E to receive offered services. The wireless communication system 1000 can provide service over a large geographic region, in one example (e.g. macrocells 1002A-1002G can cover a few blocks in a neighborhood, and the small scale access points 1008A-1008E can be present in areas such as residences, office buildings, and/or the like as described). In an example, the mobile devices 1006A-1006I can establish connection with the access points 1004A-1004G and/or 1008A-1008E over the air and/or over a backhaul connection.

According to an example, mobile devices 1006A-1006I can travel throughout the wireless network and reselect cells provided by the various access points 1004A-1004G and 1008A-1008E. Handover can be performed for a variety of reasons, such as proximity to a target access point, services offered by a target access point, protocols or standards supported by a target access point, favorable billing associated with a target access point, etc. In an example, mobile device 1006D can communicate with access point 1004D and handover can be initiated to small scale access point 1008C when within a specified proximity or measured signal strength thereof. To facilitate reselecting small scale access point 1008C, the source access point 1004D can transmit information to the target small scale access point 1008C regarding the mobile device 1006D, such as a context or other information relevant to continuing communications therewith. Thus, the target small scale access point 1008C can provide wireless network access to the mobile device 1006D based on the contextual information to facilitate seamless handover from the access point 1004D. Due to the unplanned nature of deploying small scale access points 1008A-1008E, PCIs can collide or be confused by other access points. The PCI assignment functionality described herein can mitigate such collision and confusion, as described.

Figure 11:
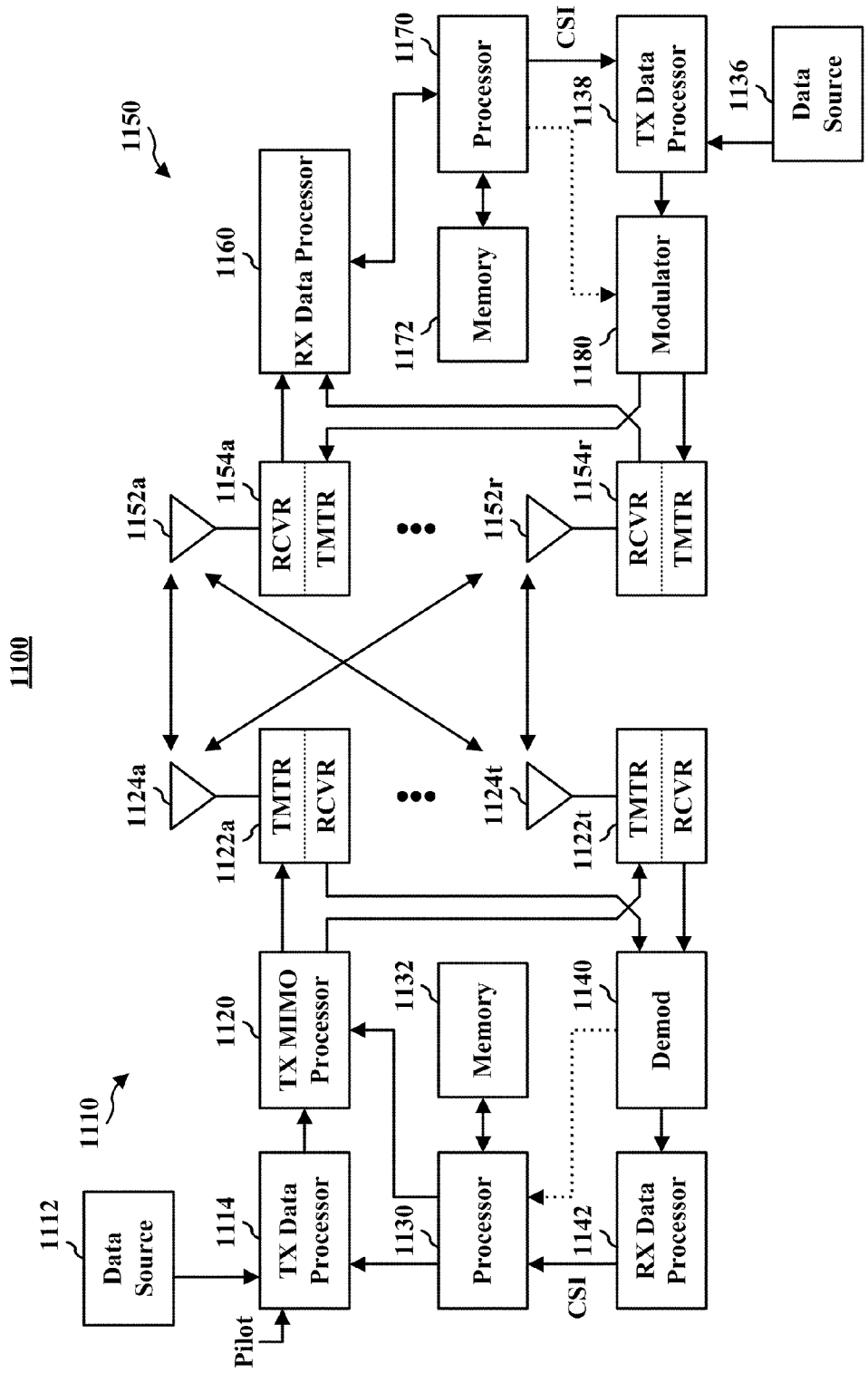
FIG. 11 is an illustration of an example wireless network environment that can be employed in conjunction with the various systems and methods described herein.

FIG. 11 shows an example wireless communication system 1100. The wireless communication system 1100 depicts one base station 1110 and one mobile device 1150 for sake of brevity. However, it is to be appreciated that system 1100 can include more than one base station and/or more than one mobile device, wherein additional base stations and/or mobile devices can be substantially similar or different from example base station 1110 and mobile device 1150 described below. In addition, it is to be appreciated that base station 1110 and/or mobile device 1150 can employ the systems (FIGS. 1-3 and 8-10) and/or methods (FIGS. 4-7) described herein to facilitate wireless communication there between.

At base station 1110, traffic data for a number of data streams is provided from a data source 1112 to a transmit (TX) data processor 1114. According to an example, each data stream can be transmitted over a respective antenna. TX data processor 1114 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1150 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1130.

The modulation symbols for the data streams can be provided to a TX MIMO processor 1120, which can further process the modulation symbols (e.g., for OFDM). TX MIMO processor 1120 then provides $N_T$ modulation symbol streams to $N_T$ transmitters (TMTR) 1122a through 1122t. In various aspects, TX MIMO processor 1120 applies beamforming weights to the symbols of the data streams and to the antenna from which the symbol is being transmitted.

Each transmitter 1122 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1122a through 1122t are transmitted from $N_T$ antennas 1124a through 1124t, respectively.

At mobile device 1150, the transmitted modulated signals are received by $N_R$ antennas 1152a through 1152r and the received signal from each antenna 1152 is provided to a respective receiver (RCVR) 1154a through 1154r. Each receiver 1154 conditions (e.g., filters, amplifies, and downconverts) a respective signal, digitizes the conditioned signal to provide samples, and further processes the samples to provide a corresponding "received" symbol stream.

An RX data processor 1160 can receive and process the $N_R$ received symbol streams from $N_R$ receivers 1154 based on a particular receiver processing technique to provide $N_T$ "detected" symbol streams. RX data processor 1160 can demodulate, deinterleave, and decode each detected symbol stream to recover the traffic data for the data stream. The processing by RX data processor 1160 is complementary to that performed by TX MIMO processor 1120 and TX data processor 1114 at base station 1110.

A processor 1170 can periodically determine which preceding matrix to utilize as discussed above. Further, processor 1170 can formulate a reverse link message comprising a matrix index portion and a rank value portion.

The reverse link message can comprise various types of information regarding the communication link and/or the received data stream. The reverse link message can be processed by a TX data processor 1138, which also receives traffic data for a number of data streams from a data source 1136, modulated by a modulator 1180, conditioned by transmitters 1154a through 1154r, and transmitted back to base station 1110.

At base station 1110, the modulated signals from mobile device 1150 are received by antennas 1124, conditioned by receivers 1122, demodulated by a demodulator 1140, and processed by a RX data processor 1142 to extract the reverse link message transmitted by mobile device 1150. Further, processor 1130 can process the extracted message to determine which preceding matrix to use for determining the beamforming weights.

Processors 1130 and 1170 can direct (e.g., control, coordinate, manage, etc.) operation at base station 1110 and mobile device 1150, respectively. Respective processors 1130 and 1170 can be associated with memory 1132 and 1172 that store program codes and data. Processors 1130 and 1170 can also perform computations to derive frequency and impulse response estimates for the uplink and downlink, respectively.

It is to be understood that the aspects described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the aspects are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 12:
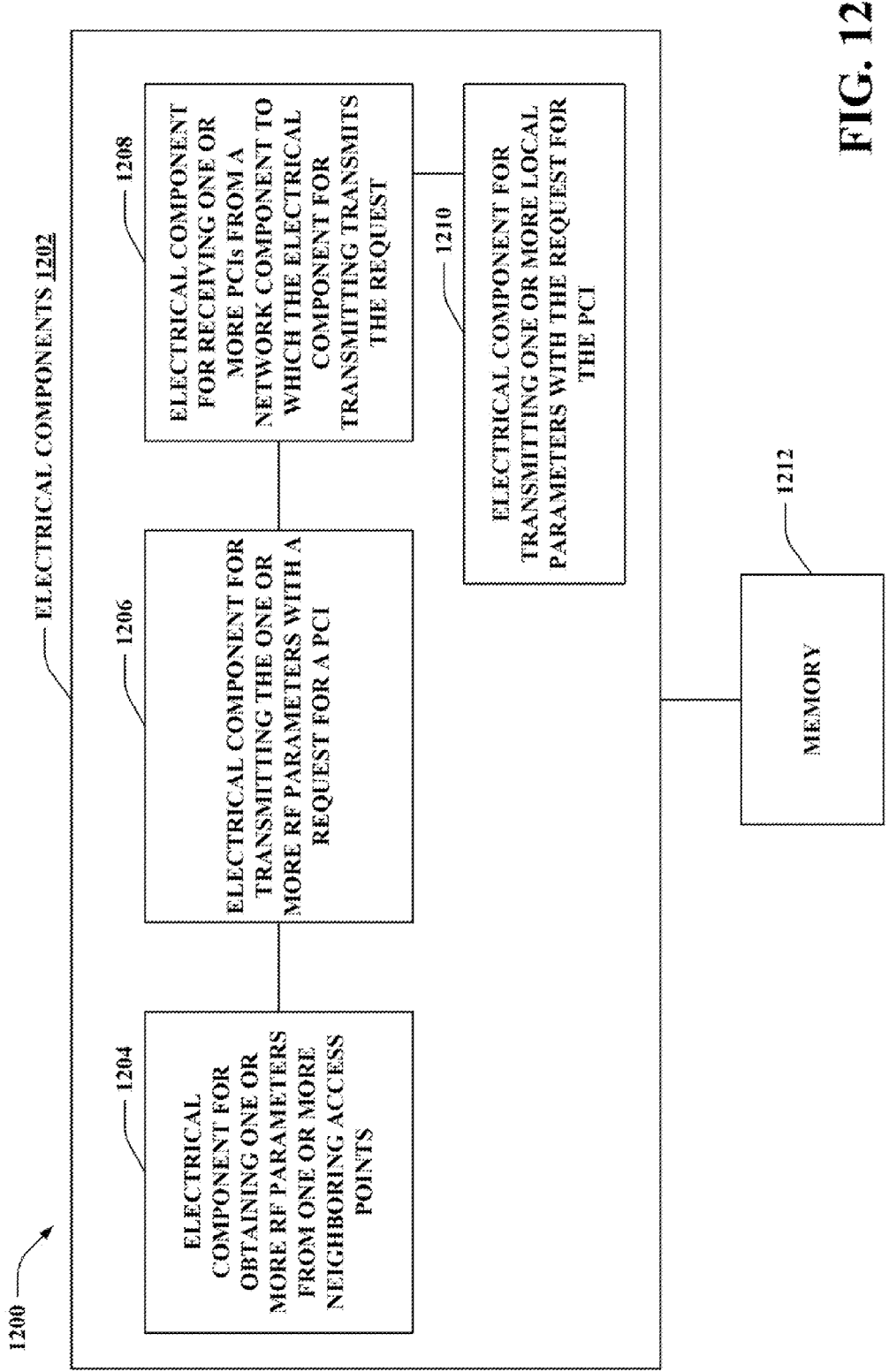
FIG. 12 is an illustration of an example system that transmits neighborhood parameters in requesting a PCI.

With reference to FIG. 12, illustrated is a system 1200 that facilitates requesting a PCI in a wireless network. For example, system 1200 can reside at least partially within a base station, mobile device, etc. It is to be appreciated that system 1200 is represented as including functional blocks, which can be functional blocks that represent functions implemented by a processor, software, or combination thereof (e.g., firmware). System 1200 includes a logical grouping 1202 of electrical components that can act in conjunction. For instance, logical grouping 1202 can include an electrical component for obtaining one or more RF parameters from one or more neighboring access points 1204. For example, as described, the RF parameters can be received by receiving and evaluating signals from the neighboring access points, receiving signal information from one or more UEs communicating with the neighboring access points, and/or the like. In addition, logical grouping 1202 can include an electrical component for transmitting the one or more RF parameters with a request for a PCI 1206.

Moreover, logical grouping 1202 can include an electrical component 1208 for receiving one or more PCIs from a network component to which the electrical component for transmitting 1206 transmits the request. In this regard, the received PCI(s) can be based on the parameters provided. In addition, logical grouping 1202 can include an electrical component for transmitting one or more local parameters with the request for the PCI 1210. Thus, the received PCI can be further based on the local parameters, as described. Additionally, system 1200 can include a memory 1212 that retains instructions for executing functions associated with electrical components 1204, 1206, 1208, and 1210. While shown as being external to memory 1212, it is to be understood that one or more of electrical components 1204, 1206, 1208, and 1210 can exist within memory 1212.

Figure 13:
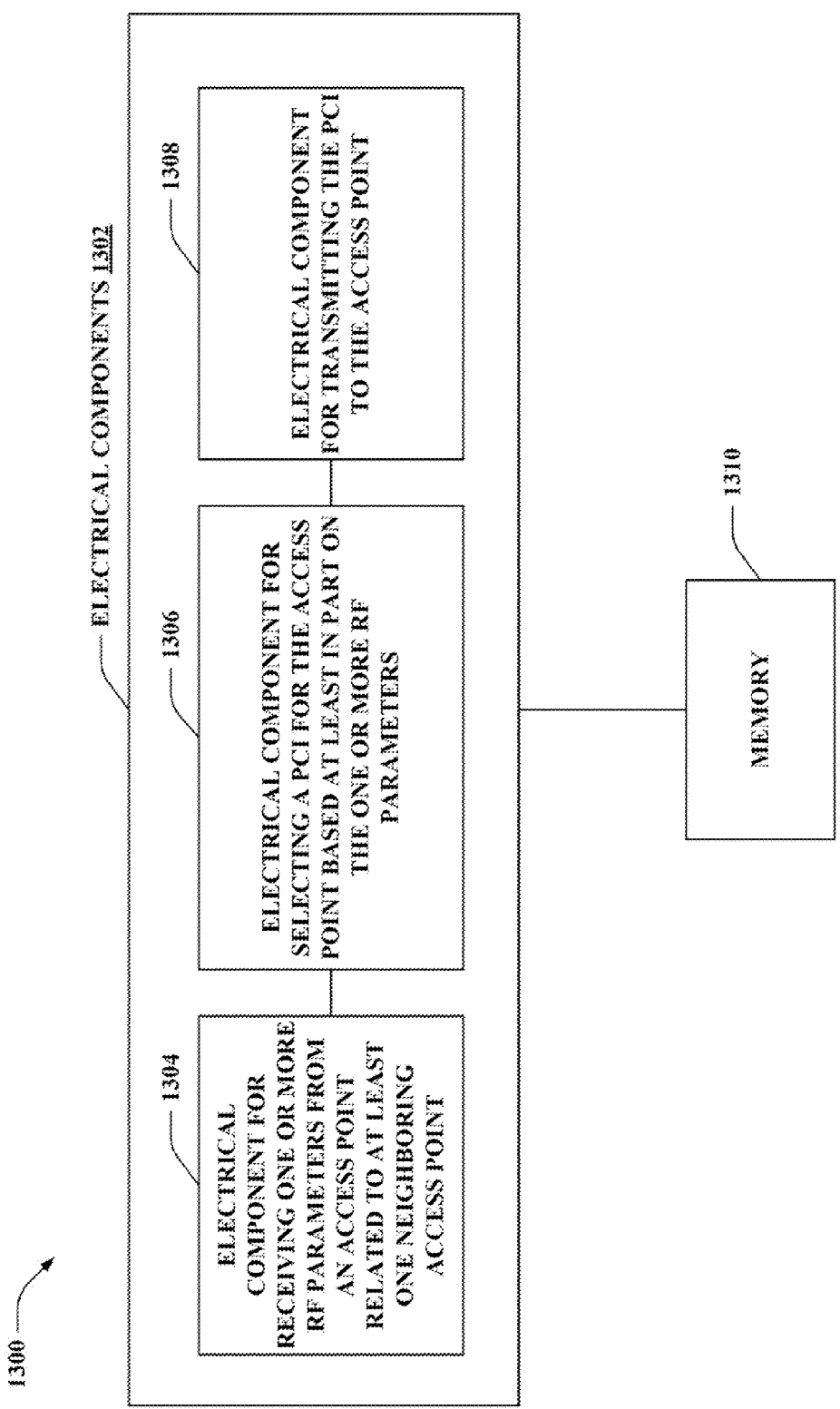
FIG. 13 is an illustration of an example system that receives a PCI request comprising neighborhood parameters.

With reference to FIG. 13, illustrated is a system 1300 that selects a PCI for an access point based on neighborhood RF parameters. For example, system 1300 can reside at least partially within a base station, mobile device, etc. It is to be appreciated that system 1300 is represented as including functional blocks, which can be functional blocks that represent functions implemented by a processor, software, or combination thereof (e.g., firmware). System 1300 includes a logical grouping 1302 of electrical components that can act in conjunction. For instance, logical grouping 1302 can include an electrical component for receiving one or more RF parameters from an access point related to at least one neighboring access point 1304. As described, the parameters can relate to received signal strength of the neighboring access point, identification, PCI, and/or the like. Furthermore, logical grouping 1302 can include an electrical component for selecting a PCI for the access point based at least in part on the one or more RF parameters 1306.

Thus, as described, where the parameters indicate an access point has a signal strength below a threshold, a PCI of the related access point can be selected for the access point. Moreover, as described, the electrical component for receiving 1304 can additionally receive local parameters from the access point, and the electrical component for selecting 1306 can select a PCI further based on the local parameters, as described. In addition, the electrical component for selecting 1306 can select the PCI further based on local parameters received from the neighboring access points during previous PCI requests, as described above. Furthermore, logical grouping 1302 can include an electrical component for transmitting the PCI to the access point 1308. Additionally, system 1300 can include a memory 1310 that retains instructions for executing functions associated with electrical components 1304, 1306, and 1308. While shown as being external to memory 1310, it is to be understood that one or more of electrical components 1304, 1306, and 1308 can exist within memory 1310.

Figure 14:
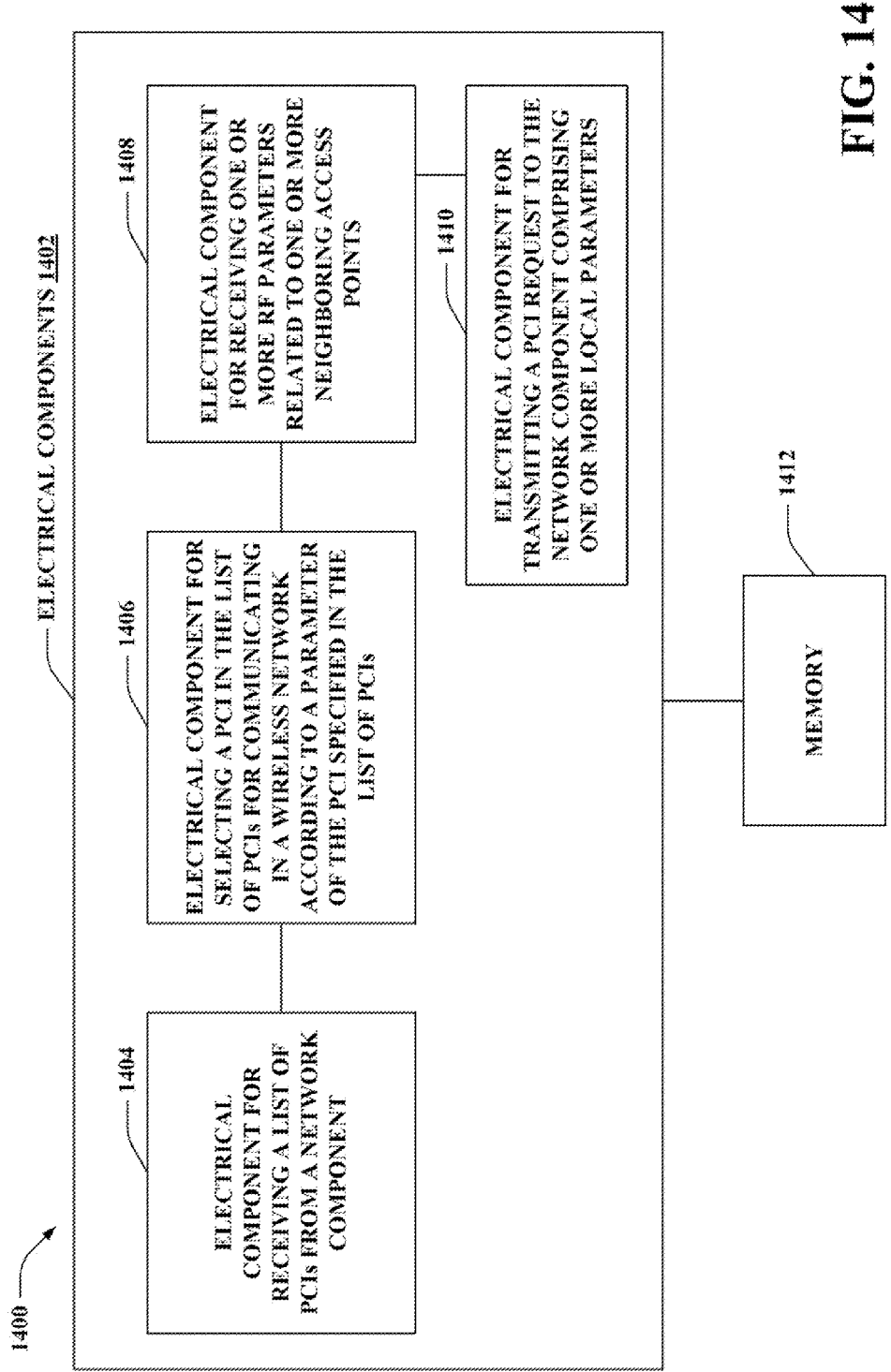
FIG. 14 is an illustration of an example system that receives a list of PCIs in response to a PCI request.

With reference to FIG. 14, illustrated is a system 1400 that facilitates receiving a list of PCIs and selecting a PCI from the list. For example, system 1400 can reside at least partially within a base station, mobile device, etc. It is to be appreciated that system 1400 is represented as including functional blocks, which can be functional blocks that represent functions implemented by a processor, software, or combination thereof (e.g., firmware). System 1400 includes a logical grouping 1402 of electrical components that can act in conjunction. For instance, logical grouping 1402 can include an electrical component for receiving a list of PCIs from a network component 1404. The list, as described in one example, can be prioritized according to desirability by the network component. In addition, logical grouping 1402 can include an electrical component for selecting a PCI in the list of PCIs for communicating in a wireless network according to a parameter of the PCI specified in the list of PCIs 1406. The parameter can be a priority of the PCI in the list, a probability that one or more access points will select the PCI, and/or the like.

Moreover, logical grouping 1402 can include an electrical component for receiving one or more RF parameters related to one or more neighboring access points 1408. Thus, the electrical component for selecting the PCI 1406 can select the PCI in the list based additionally on the RF parameters. For example, if a highest ranking PCI in the list has undesirable RF parameters from an access point using the PCI, a next highest can be selected by the electrical component 1406, as described. In addition, logical grouping 1402 can include an electrical component for transmitting a PCI request to the network component comprising one or more local parameters 1410. Thus, for example, the received list can be prioritized based on the local parameters. Additionally, system 1400 can include a memory 1412 that retains instructions for executing functions associated with electrical components 1404, 1406, 1408, and 1410. While shown as being external to memory 1412, it is to be understood that one or more of electrical components 1404, 1406, 1408, and 1410 can exist within memory 1412.

Figure 15:
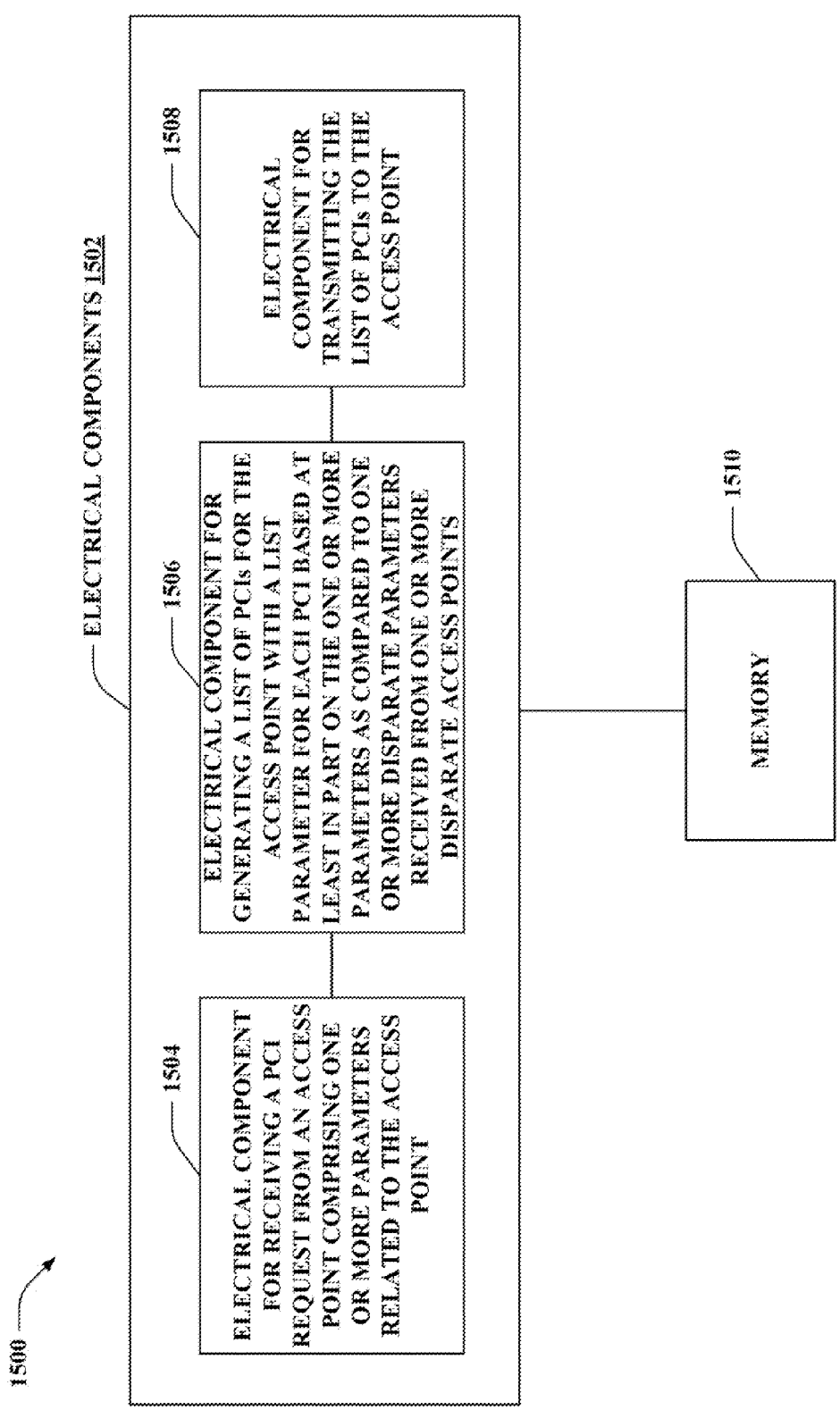
FIG. 15 is an illustration of an example system that generates a list of PCIs based on a PCI request.

With reference to FIG. 15, illustrated is a system 1500 that provides a prioritized list of PCIs to an access point. For example, system 1500 can reside at least partially within a base station, mobile device, etc. It is to be appreciated that system 1500 is represented as including functional blocks, which can be functional blocks that represent functions implemented by a processor, software, or combination thereof (e.g., firmware). System 1500 includes a logical grouping 1502 of electrical components that can act in conjunction. For instance, logical grouping 1502 can include an electrical component for receiving a PCI request from an access point comprising one or more parameters related to the access point 1504. As described, the parameters can relate to location, altitude, transmit power, one or more neighborhood parameters, and/or the like. Furthermore, logical grouping 1502 can include an electrical component for generating a list of PCIs for the access point with a list parameter for each PCI based at least in part on the one or more parameters as compared to one or more disparate parameters received from one or more disparate access points 1506. For example, the parameter can relate to a priority of a given PCI in the list, a probability that one or more access points will select the PCI in the list, and/or the like.

Thus, as described, the list can be generated to avoid PCI collision with disparate access points near the access point. This information can be known from the parameters received from the access point and disparate access points in previous PCI requests, as described. In addition, a permutation of a previous list can be provided by electrical component 1506. For example, where electrical component 1506 generates a list for the access point, it can generate a disparate list for a disparate neighboring access point reprioritizing the list based on the list generated for the access point, as described. Furthermore, logical grouping 1502 can include an electrical component for transmitting the list of PCIs to the access point 1508. Additionally, system 1500 can include a memory 1510 that retains instructions for executing functions associated with electrical components 1504, 1506, and 1508. While shown as being external to memory 1510, it is to be understood that one or more of electrical components 1504, 1506, and 1508 can exist within memory 1510.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Furthermore, to the extent that the term "includes" is used in either the detailed description or the claims, such term is intended to be inclusive in a manner similar to the term "comprising" as "comprising" is interpreted when employed as a transitional word in a claim. Furthermore, although elements of the described aspects and/or aspects may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method, comprising:
   receiving a physical cell identifier (PCI) request from an access point comprising one or more radio frequency (RF) parameters related to surrounding access points;
   determining a PCI for the access point based at least in part on comparing the one or more RF parameters and available PCIs; and
   transmitting the PCI to the access point.

2. The method of claim 1, further comprising receiving one or more local parameters related to the access point in the PCI request.

3. The method of claim 1, wherein the receiving the PCI request from the access point includes receiving the PCI request from the access point comprising the one or more RF parameters that include a strength at the access point of a signal received from at least one of the surrounding access points.

4. The method of claim 3, wherein the determining the PCI includes evaluating whether the strength of the signal is below or above a threshold strength.

5. The method of claim 1, wherein the determining the PCI is further based at least in part on evaluating one or more local parameters received from at least one of the surrounding access points.

6. A wireless communications apparatus, comprising:
   at least one processor configured to:
      receive a physical cell identifier (PCI) request from an access point comprising one or more radio frequency (RF) parameters related to surrounding access points;
      determine a PCI for the access point based at least in part on comparing the one or more RF parameters and available PCIs; and
      transmit the PCI to the access point; and
   a memory coupled to the at least one processor.

7. The wireless communications apparatus of claim 6, wherein the at least one processor is further configured to receive one or more local parameters from the access point and the at least one processor determines the PCI further based on the one or more local parameters.

8. The wireless communications apparatus of claim 6, wherein the one or more RF parameters includes a signal strength of at least one of the surrounding access points as received by the access point.

9. The wireless communications apparatus of claim 8, wherein the at least one processor determines the PCI by comparing the signal strength with other signal strengths in the RF parameters and selecting a PCI of a disparate access point having signal strength below a threshold level.

10. The wireless communications apparatus of claim 8, wherein the at least one processor determines the PCI further based at least in part on one or more local parameters received from at least one of the surrounding access points in a PCI request therefrom.

11. An apparatus, comprising:
    means for receiving a physical cell identifier (PCI) request from an access point comprising one or more radio frequency (RF) parameters related to surrounding access points;
    means for determining a PCI for the access point based at least in part on comparing the one or more RF parameters and available PCIs; and
    means for transmitting the PCI to the access point.

12. The apparatus of claim 11, wherein the means for receiving the one or more RF parameters further receives one or more local parameters related to the access point and the means for determining the PCI determines the PCI further based on the one or more local parameters.

13. The apparatus of claim 11, wherein the one or more RF parameters is a signal strength related to at least one of the surrounding access points.

14. The apparatus of claim 13, wherein the means for determining the PCI determines the PCI of at least one of the surrounding access points where the signal strength is below a threshold level.

15. The apparatus of claim 13, wherein the means for determining the PCI determines the PCI of at least one of the surrounding access points where the signal strength is lower than substantially all signal strengths received in the one or more RF parameters.

16. The apparatus of claim 11, wherein the means for selecting the PCI selects the PCI further based at least in part on one or more local parameters received from at least one of the surrounding access points in a previous PCI request.

17. A computer program product, comprising:
    a non-transitory computer-readable medium comprising:
       code for causing at least one computer to receive a physical cell identifier (PCI) request from an access point comprising one or more radio frequency (RF) parameters related to surrounding access points;
       code for causing the at least one computer to determine a PCI for the access point based at least in part on comparing the one or more RF parameters and available PCIs; and
       code for causing the at least one computer to transmit the PCI to the access point.

18. The computer program product of claim 17, wherein the computer-readable medium further comprises code for causing the at least one computer to receive one or more local parameters related to the access point in the PCI request.

19. The computer program product of claim 18, wherein code for causing the at least one computer to determine the PCI further evaluates one or more disparate local parameters received from at least one of the one or more neighboring access points.

20. An apparatus, comprising:
    a physical cell identifier (PCI) parameter receiving component that receives a physical cell identifier (PCI) comprising one or more radio frequency (RF) parameters related to surrounding access points;
    a PCI determining component that determines a PCI for the access point based at least in part on comparing the one or more RF parameters and available PCIs; and
    a PCI transmitting component that transmits the PCI to the access point.

21. The apparatus of claim 20, wherein the PCI parameter receiving component further receives one or more local parameters related to the access point and the PCI determining component determines the PCI further based on the one or more local parameters.

22. The apparatus of claim 20, wherein the one or more RF parameters is a signal strength related to the at least one neighboring access point.

23. The apparatus of claim 22, wherein the PCI determining component determines the PCI of at least one of the surrounding access points where the signal strength is below a threshold level.

24. The apparatus of claim 20, wherein the PCI determining component determines the PCI further based at least in part on one or more local parameters received from at least one of the surrounding access points in a previous PCI request.

25. A method, comprising:
receiving a list of physical cell identifiers (PCI) from a network component; and
selecting a PCI from the list of PCIs based at least in part on a parameter related to the PCI indicated in the list of PCIs and on one or more radio frequency (RF) parameters related to one or more neighboring access points.

26. The method of claim 25, wherein the selecting the PCI includes selecting the PCI from the list of PCIs based at least in part on a priority of the PCI in the list of PCIs, wherein the priority of the PCI is implicit in a location of the PCI in the list of PCIs.

27. The method of claim 25, wherein the selecting the PCI includes selecting the PCI from the list of PCIs based at least in part on a probability of disparate access points selecting the PCI.

28. The method of claim 25, further comprising receiving the one or more radio frequency (RF) parameters related to one or more neighboring access points, wherein selecting the PCI further includes evaluating the one or more RF parameters where respective access points use the PCI.

29. The method of claim 28, wherein the receiving the one or more RF parameters includes receiving the one or more RF parameters at least in part by measuring signals transmitted by the one or more neighboring access points.

30. The method of claim 28, wherein the receiving the one or more RF parameters includes receiving the one or more RF parameters from one or more UEs communicating with the one or more neighboring access points.

31. The method of claim 28, wherein receiving the one or more RF parameters includes receiving the one or more RF parameters over a backhaul link with the one or more neighboring access points.

32. The method of claim 25, further comprising transmitting a PCI request to the network component comprising one or more local parameters, wherein the list of PCIs is received in response to the PCI request.

33. A wireless communications apparatus, comprising:
at least one processor configured to:
receive a list of physical cell identifiers (PCI) from a network component; and
select a PCI from the list of PCIs based on an associated parameter in the list and on one or more radio frequency (RF) parameters related to one or more neighboring access points to facilitate communicating in a wireless network; and
a memory coupled to the at least one processor.

34. The wireless communications apparatus of claim 33, wherein the at least one processor is configured to select the PCI from the list of PCIs based at least in part on a priority of the PCI in the list of PCIs, wherein the priority of the PCI is implicit in a location of the PCI in the list of PCIs.

35. The wireless communications apparatus of claim 33, wherein the associated parameter is a probability that one or more access points will select the PCI.

36. The wireless communications apparatus of claim 33, wherein the at least one processor is further configured to receive the one or more radio frequency (RF) parameters from surrounding access points and the at least one processor selects the PCI further based on the one or more RF parameters.

37. The wireless communications apparatus of claim 33, wherein the at least one processor receives the one or more RF parameters from a UE communicating with the surrounding access points.

38. The wireless communications apparatus of claim 33, wherein the at least one processor is further configured to transmit a PCI request to the network component comprising one or more local parameters and the at least one processor receives the list of PCIs in response to the PCI request.

39. An apparatus, comprising:
means for receiving a list of physical cell identifiers (PCI) from a network component; and
means for selecting a PCI in the list of PCIs based on a parameter of the PCI specified in the list of PCIs and on one or more radio frequency (RF) parameters related to one or more neighboring access points.

40. The apparatus of claim 39, wherein the means for selecting the PCI includes means for selecting the PCI from the list of PCIs based at least in part on a priority of the PCI in the list of PCIs, wherein the priority of the PCI is implicit in a location of the PCI in the list of PCIs.

41. The apparatus of claim 39, wherein the parameter is a probability that one or more disparate access points with select the PCI.

42. The apparatus of claim 39, further comprising means for receiving the one or more radio frequency (RF) parameters related to one or more neighboring access points, wherein the means for selecting the PCI in the list of PCIs evaluates the one or more RF parameters where respective access points use the PCI in selecting the PCI.

43. The apparatus of claim 39, wherein the means for receiving the one or more RF parameters measures signals transmitted by the one or more neighboring access points to obtain the RF parameters.

44. The apparatus of claim 42, wherein the means for receiving the one or more RF parameters receives the one or more RF parameters from one or more UEs communicating with the one or more neighboring access points.

45. The apparatus of claim 42, wherein the means for receiving the one or more RF parameters receives the one or more RF parameters over a backhaul link with the one or more neighboring access points.

46. The apparatus of claim 39, further comprising means for transmitting a PCI request to the network component comprising one or more local parameters, wherein the means for receiving the list of PCIs receives the list in response to the PCI request.

47. The apparatus of claim 39, wherein the apparatus utilizes the selected PCI in subsequent communication over the wireless network.

48. A computer program product, comprising:
a non-transitory computer-readable medium comprising:
code for causing at least one computer to receive a list of physical cell identifiers (PCI) from a network component; and code for causing the at least one computer to select a PCI from the list of PCIs based at least in part on a parameter of the PCI indicated in the list of PCIs and on one or more radio frequency (RF) parameters related to one or more neighboring access points.

49. The computer program product of claim 48, wherein the code for causing the at least one computer to select comprising code for causing the at least one computer to select the PCI from the list of PCIs based at least in part on a priority of the PCI in the list of PCIs, wherein the priority of the PCI is implicit in a location of the PCI in the list of PCIs.

50. The computer program product of claim 48, wherein the parameter is a probability of disparate access points selecting the PCI.

51. The computer program product of claim 48, wherein the computer-readable medium further comprises code for causing the at least one computer to receive the one or more radio frequency (RF) parameters related to one or more neighboring access points, wherein selecting the PCI further includes evaluating the one or more RF parameters where respective access points use the PCI.

52. The computer program product of claim 51, wherein the code for causing the computer to receive the one or more RF parameters receives the one or more RF parameters at least in part by measuring signals transmitted by the one or more neighboring access points.

53. The computer program product of claim 48, wherein the computer-readable medium further comprises code for causing the at least one computer to transmit a PCI request to the network component comprising one or more local parameters, wherein the list of PCIs is received in response to the PCI request.

54. An apparatus, comprising:
a physical cell identifier (PCI) receiving component that obtains a list of PCIs from a network component; and
a PCI selecting component that chooses a PCI in the list of PCIs based on a parameter of the PCI specified in the list of PCIs and on one or more radio frequency (RF) parameters related to one or more neighboring access points.

55. The apparatus of claim 54, wherein the PCI selecting component is further configured to select the PCI from the list of PCIs based at least in part on a priority of the PCI in the list of PCIs, wherein the priority of the PCI is implicit in a location of the PCI in the list of PCIs.

56. The apparatus of claim 54, wherein the parameter is a probability that one or more disparate access points with select the PCI.

57. The apparatus of claim 54, further comprising a neighborhood measuring component that receives the one or more radio frequency (RF) parameters related to one or more neighboring access points, wherein the PCI selecting component evaluates the one or more RF parameters where respective access points use the PCI in selecting the PCI.

58. The apparatus of claim 57, wherein the neighborhood measuring component analyzes signals transmitted by the one or more neighboring access points to obtain the RF parameters.

59. The apparatus of claim 54, further comprising a PCI requesting component that transmits a PCI request to the network component comprising one or more local parameters, wherein the PCI receiving component obtains the list of PCIs receives the list in response to the PCI request.

60. A method, comprising:
receiving a physical cell identifier (PCI) request from an access point comprising one or more parameters related to the access point;
evaluating one or more disparate parameters received from a plurality of disparate access points; and
generating a list of PCIs for the access point indicating at least one list parameter for each PCI based at least in part on the one or more parameters as compared to the one or more disparate parameters.

61. The method of claim 60, wherein the indicating the at least one list parameter includes specifying a priority of the PCI in the list of PCIs.

62. The method of claim 60, wherein the indicating the at least one list parameter includes specifying a probability that one or more disparate access points will select the PCI.

63. The method of claim 60, wherein generating the list includes prioritizing the list based on one or more access point parameters of the access point as compared to one or more disparate access point parameters of at least one of the plurality of disparate access points.

64. The method of claim 63, wherein the one or more access point parameters and the one or more disparate access point parameters include a transmit power, location, configuration, number of associated users, or type of cell, related respectively to the access point and the at least one of the plurality of disparate access points.

65. The method of claim 60, further comprising transmitting the list of PCIs to the access point.

66. The method of claim 60, further comprising:
receiving a second PCI request from a second access point comprising a second set of parameters;
generating a permutation of the list of PCIs for the second access point based at least in part on analyzing the second set of parameters; and
transmitting the permutation of the list of PCIs to the second access point.

67. A wireless communications apparatus, comprising:
at least one processor configured to:
obtain a physical cell identifier (PCI) request from an access point comprising one or more parameters related to the access point;
analyze one or more disparate parameters received from a plurality of disparate access points; and
create a list of PCIs for the access point with a list parameter for each of the PCIs based at least in part on the one or more parameters as compared to the one or more disparate parameters; and
a memory coupled to the at least one processor.

68. The wireless communications apparatus of claim 67, wherein the list parameter relates to a priority of each PCI in the list of PCIs.

69. The wireless communications apparatus of claim 67, wherein the list parameter relates to a probability that one or more access points will select the each PCI in the list of PCIs.

70. The wireless communications apparatus of claim 67, wherein the at least one processor prioritizes the list of PCIs based on a received access point parameter of the access point as compared to a disparate received access point of at least one of the plurality of disparate access points.

71. The wireless communications apparatus of claim 67, wherein the at least one processor is further configured to transmit the list of PCIs to the access point.

72. An apparatus, comprising:
means for receiving a physical cell identifier (PCI) request from an access point comprising one or more parameters related to the access point; and
means for generating a list of PCIs for the access point with a list parameter for each PCI based at least in part on the one or more parameters as compared to one or more disparate parameters received from one or more disparate access points.

73. The apparatus of claim 72, wherein the list parameter is a priority of the PCI in the list of PCIs.

74. The apparatus of claim 72, wherein the list parameter is a probability that one or more disparate access points will select the PCI.

75. The apparatus of claim 72, wherein the means for generating the list prioritizes the list based on an access parameter of the access point as compared to a disparate access point parameter of at least one of the one or more disparate access points.

76. The apparatus of claim 75, wherein the one or more access point parameters and the one or more disparate access point parameters include a transmit power, location, configuration, number of associated users, or type of cell, related respectively to the access point and the at least one of the one or more disparate access points.

77. The apparatus of claim 72, further comprising means for transmitting the list of PCIs to the access point.

78. The apparatus of claim 72, wherein the means for receiving the PCI request receives a second PCI request from a second access point and the means for generating the list of PCIs generates a permutation of the list of PCIs for the second access point based at least in part on evaluating a second set of parameters in the second PCI request.

79. A computer program product, comprising:
a non-transitory computer-readable medium comprising:
code for causing at least one computer to receive a physical cell identifier (PCI) request from an access point comprising one or more parameters related to the access point;
code for causing the at least one computer to evaluate one or more disparate parameters received from a plurality of disparate access points; and
code for causing the at least one computer to generate a list of PCIs for the access point with list parameters based at least in part on the one or more parameters as compared to the one or more disparate parameters.

80. The computer program product of claim 79, wherein the list parameters relate to priority of the PCIs in the list.

81. The computer program product, of claim 79, wherein the list parameters relate to probabilities that one or more disparate access points will select the PCIs.

82. The computer program product of claim 79, wherein the code for causing the at least one computer to generate the list prioritizes the list based on an access point parameter of the access point as compared to one or more disparate parameters of at least one of the plurality of disparate access points.

83. The computer program product of claim 79, wherein the computer-readable medium further comprises code for causing the at least one computer to transmit the list of PCIs to the access point.

84. An apparatus, comprising:
a physical cell identifier (PCI) parameter receiving component that obtains a PCI request from an access point comprising one or more parameters related to the access point; and
a PCI listing component that creates a list of PCIs for the access point with a list parameter for each PCI based at least in part on the one or more parameters as compared to one or more disparate parameters received from one or more disparate access points.

85. The apparatus of claim 84, wherein the list parameter relates to a priority of a PCI in the list of PCIs.

86. The apparatus of claim 84, wherein the list parameter relates to a probability that one or more disparate access points will select a PCI in the list of PCIs.

87. The apparatus of claim 84, wherein the PCI listing component prioritizes the list based on an access point parameter of the access point as compared to a disparate access point parameter of at least one of the one or more disparate access points.

88. The apparatus of claim 84, further comprising a PCI transmitting component that provides the list of PCIs to the access point.

89. The apparatus of claim 84, wherein the PCI parameter receiving component receives a second PCI request from a second access point and the PCI listing component generates a permutation of the list of PCIs for the second access point based at least in part on evaluating a second set of parameters in the second PCI request.

* * * * *